Figure 1:
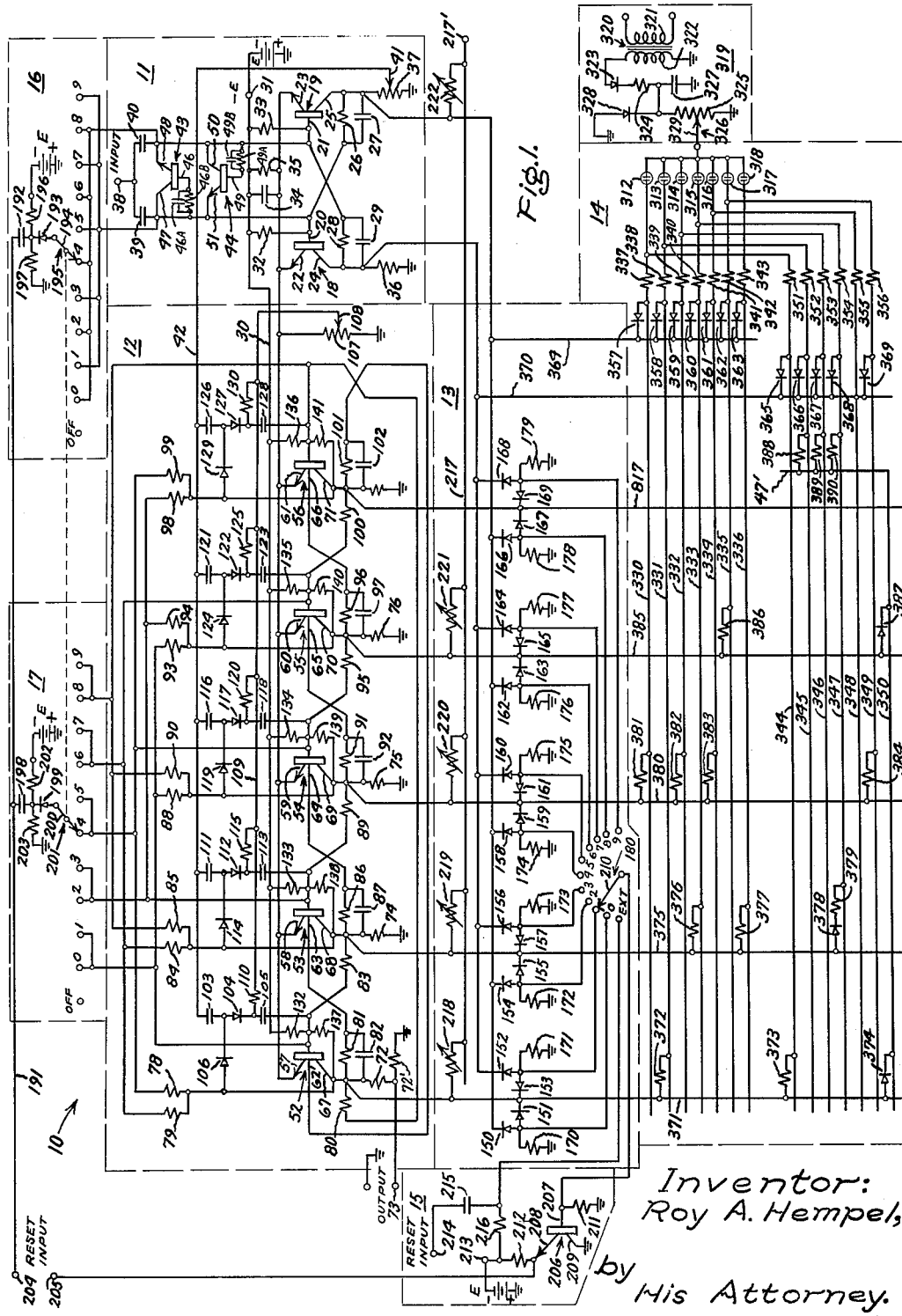

June 7, 1966 R. A. HEMPEL 3,255,359
HIGH SPEED COUNTER CIRCUIT RESPONSIVE TO INPUT PULSES FOR
ASSUMING ONE OF A PLURALITY OF STABLE STATES
Filed Dec. 7, 1959 6 Sheets-Sheet 1

Inventor:
Roy A. Hempel,
by His Attorney.

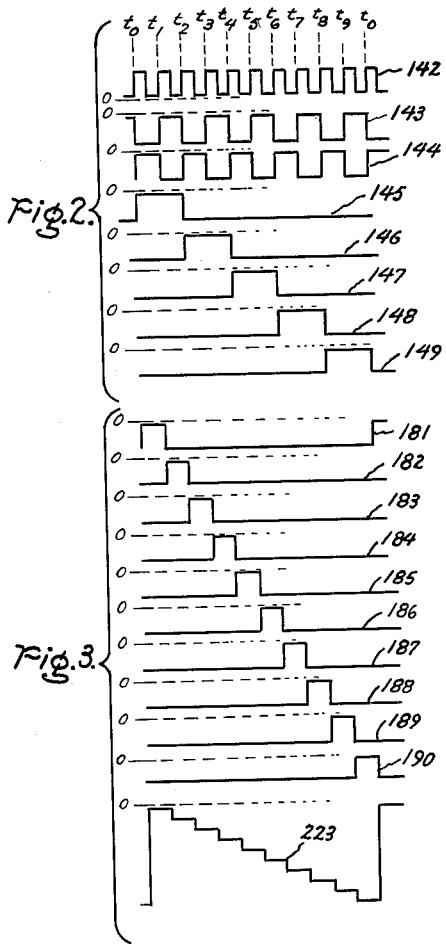
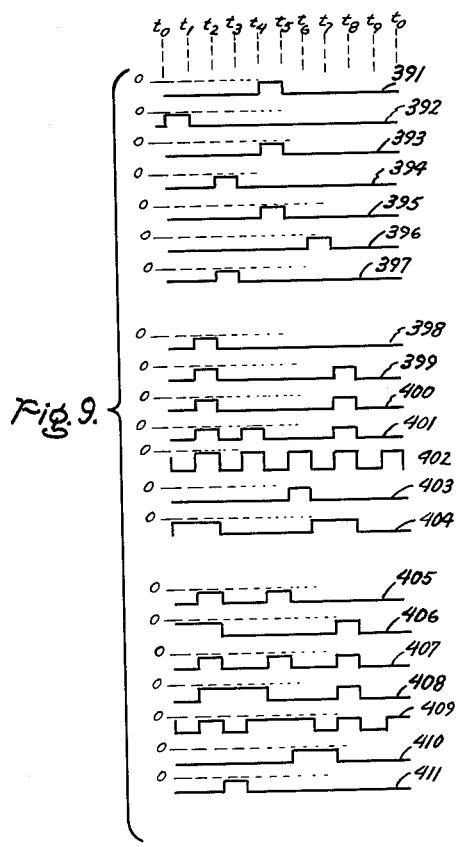
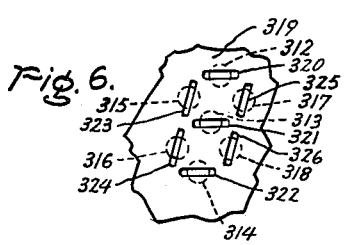

June 7, 1966  R. A. HEMPEL  3,255,359
HIGH SPEED COUNTER CIRCUIT RESPONSIVE TO INPUT PULSES FOR
ASSUMING ONE OF A PLURALITY OF STABLE STATES
Filed Dec. 7, 1959  6 Sheets-Sheet 4

Inventor:
Roy A. Hempel,
by His Attorney.

June 7, 1966  R. A. HEMPEL  3,255,359
HIGH SPEED COUNTER CIRCUIT RESPONSIVE TO INPUT PULSES FOR
ASSUMING ONE OF A PLURALITY OF STABLE STATES
Filed Dec. 7, 1959  6 Sheets-Sheet 5

Inventor:
Roy A. Hempel,
by His Attorney.

June 7, 1966  R. A. HEMPEL  3,255,359
HIGH SPEED COUNTER CIRCUIT RESPONSIVE TO INPUT PULSES FOR
ASSUMING ONE OF A PLURALITY OF STABLE STATES
Filed Dec. 7, 1959  6 Sheets-Sheet 6

Inventor:
Roy A. Hempel,
by
His Attorney.

United States Patent Office 3,255,359
Patented June 7, 1966

3,255,359
HIGH SPEED COUNTER CIRCUIT RESPONSIVE TO INPUT PULSES FOR ASSUMING ONE OF A PLURALITY OF STABLE STATES
Roy A. Hempel, Phoenix, Ariz., assignor to United Computer Company, Phoenix, Ariz.
Filed Dec. 7, 1959, Ser. No. 857,886
12 Claims. (Cl. 307—88.5)

This invention relates to an electronic apparatus and more particularly to a counter circuit responsive to electrical pulses and effective to count and yield an indication of the number of pulses received.

In many industrial and other operations, it is frequently necessary or advantageous to count the number of a series of occurrences of various kinds and to indicate the number thereof for ready reference. An examples, it may be desirable to count the number of motor or turbine revolutions, to measure the time of travel over a predetermined course of a high speed missile, in nuclear reactions, to count the number of nuclear particles or rays emitted from some material, or, in interstellar space to count the number of cosmic rays exciting an appropriate detector. While counters such as disclosed in my copending application, Serial No. 609,131, filed September 11, 1956, now Patent Number 3,038,658, together with a suitable transducer as the occasion may require, provide admirable results for the various counting tasks to which they are applied, the rapidly advancing technology of the present day requires improved counter circuits, more versatile and operable at even higher counting rates than heretofore possible. As an example, a counter may be effectively utilized for the measurement and indication of predetermined intervals of time by counting a predetermined number of cycles of a pulsed, potential wave of precisely known frequency. However, since the end of such period may coincide with an instant of time between such pulses, a higher frequency of operation would reduce the time between pulses and thus, the possible discrepancy between the time interval desired and that actually produced. It is also important in many other applications, such as the use of a counter in a planetary satellite or in contemplated interstellar vehicles, that the counter be light in weight and provide operation at a very minimum of power consumption and in some cases in which the counter is to actuate or provide signals for other circuitry, to produce an output signal of sufficiently great intensity of obviate the use of auxiliary signal amplifying means. In the use of counters providing a visual indication of the number of count, great convenience and higher reading accuracy results from the provision of a "readout" type of indicator wherein the count number is indicated in familiar arabic numerals. In prior counters utilizing such an indicator, however, the additional circuits required to operate the indicator are unduly complex and require active circuit elements such as electron tubes or transistors. In addition to the added complexity and concomitant susceptibility to failure, such circuits are more expensive initially and in upkeep.

It is frequently desirable in counter circuits, to provide interchangeability in display components as, for example, interchangeability between those utilizing neon lamps and others of the type having electrodes in the shape of arabic numerals which may be made to glow.

It is also frequently advantageous to enable resetting of a counter circuit to a count other than zero count or to effect resetting to any count in response to reception of a series of different numbers of input pulses. Thus, in the latter instances a circuit effective to produce an output pulse in response to a predetermined number of input pulses, or in other words, to divide by such a number, may be desired. Such division may be useful in counting groups or batches, in pulse generators for providing groups of pulses, in office or calculating machines, or other applications.

It is therefore a principal object of my invention to facilitate electronic counting at higher rates than heretofore achieved.

It is another object of my invention to facilitate electronic counting with the use of apparatus requiring low power.

It is another object of my invention to provide a simplified counter circuit having an output signal of relatively increased magnitude obviating auxiliary amplifying apparatus.

It is a still another object of my invention to enable resetting of a counter circuit after any predetermined number of input pulses and to any predetermined number of count.

It is still another object of my invention to provide a novel and relatively inexpensive numerical display circuit.

It is still another object of my invention to facilitate interchangeable coupling between a counter circuit and either a multi-lamp display circuit or a numerical display circuit utilizing a numerical display tube having electrodes in the shape of arabic numerals.

In accordance with one aspect of my invention, improved counter frequency response and improved switching of a binary circuit of the bistable multivibrator type having cross-coupled bases and collectors is achieved by the provision of an additional pair of active circuit elements, herein being three element transistors, connected between bases of the binary circuit transistors. The emitter of a first additional transistor and the collector of the second additional transistor are connected to the base of one binary circuit transistor while the collector of the first additional and the emitter of the second additional transistor are connected to the base of the other binary circuit transistor. The bases of respective first and second additional transistors are connected to the bases of second and first binary circuit transistors through respective circuits each including a resistor and a capacitor connected in parallel. Input pulses to the binary circuit are applied in parallel circuit arrangement to the binary circuit bases and the effect of the additional transistors is to enhance the signal applied to the one of the binary circuit transistors to facilitate its change in condition of conduction. Thus, the circuit is responsive to weaker signals and is also responsive to an increased rapidity of signals since the switching action is hastened.

In accordance with another aspect of my invention, improved counter frequency response and quinary switching action is achieved by the provision of gating circuits in the input to each quinary circuit transistor. Each gating circuit includes a first diode interposed in the input line with its cathode coupled to the transistor base through a capacitor and a second diode with its anode connected to the transistor collector and its cathode connected to the anode of the first diode. Additional provision is made for applying a negative bias less than the negative potential of a conducting transistor collector to the cathode of each first diode. In accordance with this gating circuit arrangement, the potential bias across the first diode which is in immediate circuit with the non-conducting transistor, is biased in a forward direction, with its anode somewhat more positive than its cathode and the first diode in immediate circuit with each non-conducting transistor is somewhat reverse biased with its anode somewhat negative with respect to its cathode. The consequences of such biasing is increased effectiveness of input pulses of positive polarity tending to render the non-conducting transistor conducting and the decreased effectiveness of the same input pulses tending to maintain conducting transistors conducting. This is particularly significant as to the transistor next adjacent to the non-conducting transistor in the quinary loop since for proper operation the output pulse of the conducting transistor rendered conducting is applied to render this next adjacent transistor non-conducting.

In accordance with another aspect of my invention, improved temperature stability of the quinary circuit transistors is achieved by providing a resistive interconnection between the collector and base of each transistor. The effect of such interconnection is to minimize the effects of base to collector potential at elevated temperatures. Accordingly, greater variation in individual transistor parameters is possible without adverse effects.

In accordance with another aspect of my invention higher potentials of output pulses from the counter are facilitated by the provision of diode elements for combining the potentials of each of the binary circuit collectors with the potential of one of the quinary circuit collectors. Ten pairs of diodes with anodes of each pair conductively joined, are provided, and the cathode of one diode of each pair is connected to a binary circuit transistor collector and the cathode of the other diode of each pair is connected to a quinary circuit transistor collector. The combination of quinary and binary transistor collectors connected to different pairs of diode cathodes, is also different whereby all possible combinations, herein being ten, are formed. Upon the coincident application of a relatively low negative potential derived from the collectors of cut-off transistors, to the cathode of each diode of each pair, a unique, low, output potential is derived at the anode junction of such a pair. Because of the relatively low resistance of the diodes in their forward direction and the high resistance in the reverse direction, the output pulses so derived are of relatively great magnitude.

In accordance with another aspect of my invention including three selector switches, the counter circuit may be reset to any count and in response to any number of pulses from one to ten. One selector switch is positionable to receive the output pulse from any one of the anode junctions of the pairs of transistors of the coincidence circuit and the other two selector switches have connections for applying such output pulse to the bases of any combination of quinary and binary circuit transistors. Thus, the first switch provides a pulse to the other two switches at a predetermined count and the other two switches effect reset of the circuit to another predetermined count.

In accordance with still another aspect of my invention, provision is made with relatively simple and inexpensive circuit components for visually displaying the count number of the circuit. Seven slits are formed in an opaque surface and are disposed in the form of a parallelogram with one slit generally bisecting the parallelogram. Each slit exposes a different neon lamp and in accordance with a feature of my invention, predetermined combinations of the neon lamps are selectively lit or extinguished by combinations of binary and quinary circuit transistor collector potentials to form arabic numerals, zero through nine, as viewed through the slits, corresponding to the number of count of the circuit. As another feature of my invention, the indicator circuit is interchangeable with direct reading numerical display tubes.

Figure 4:
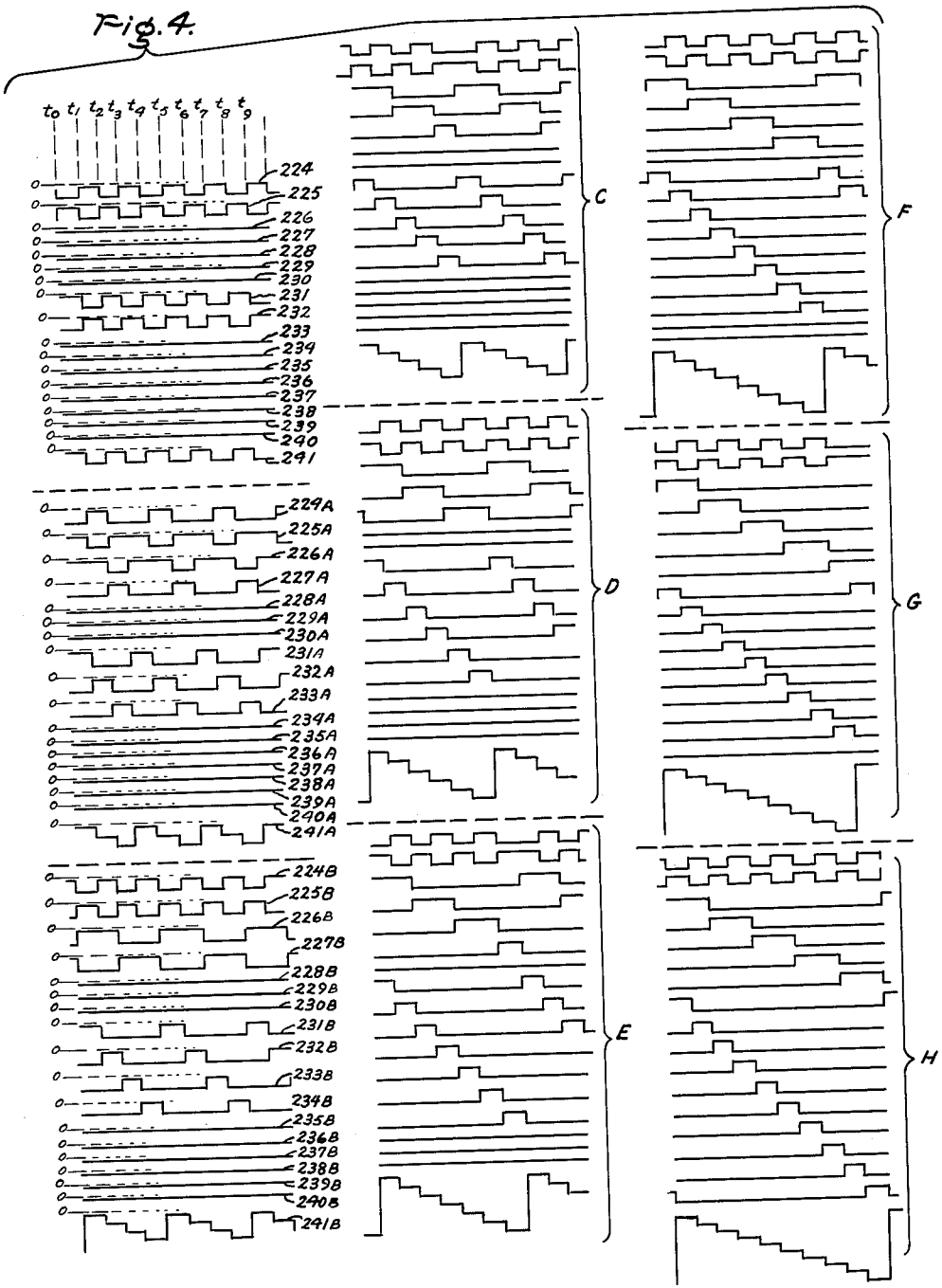
Figure 5:
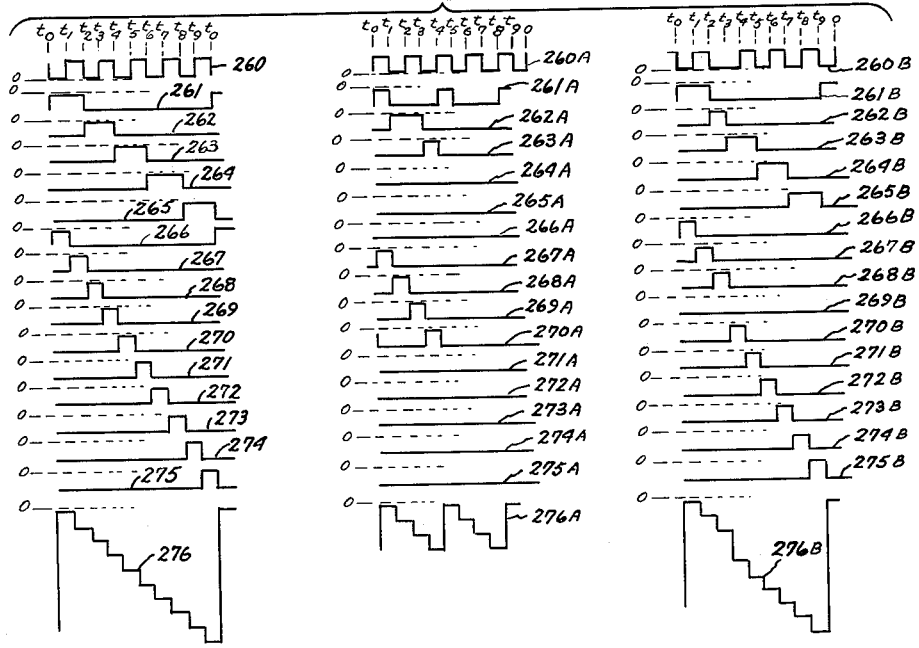
Figure 13:
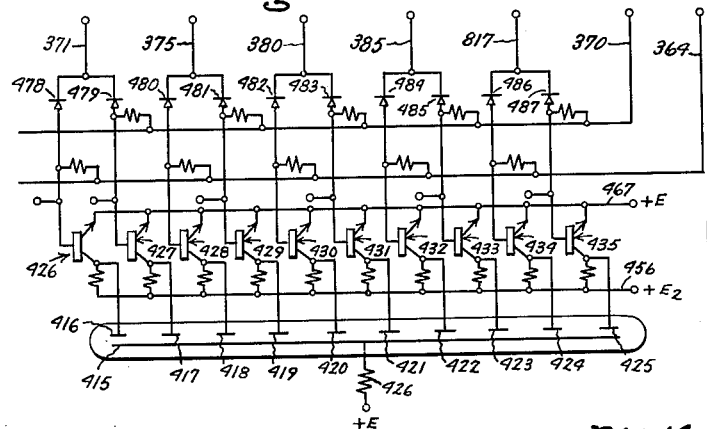
Figure 14:
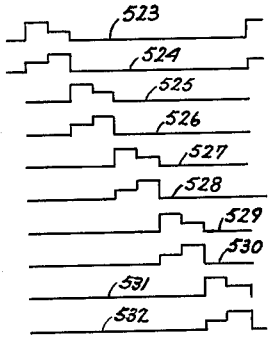
Figure 12:
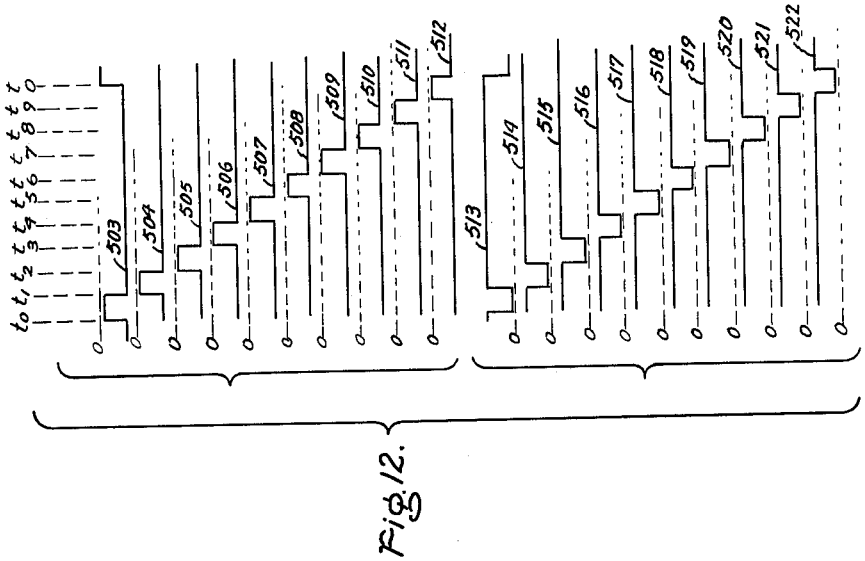
Figure 10:
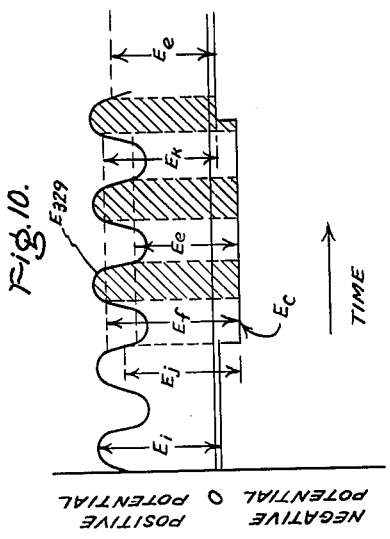
Figure 11:
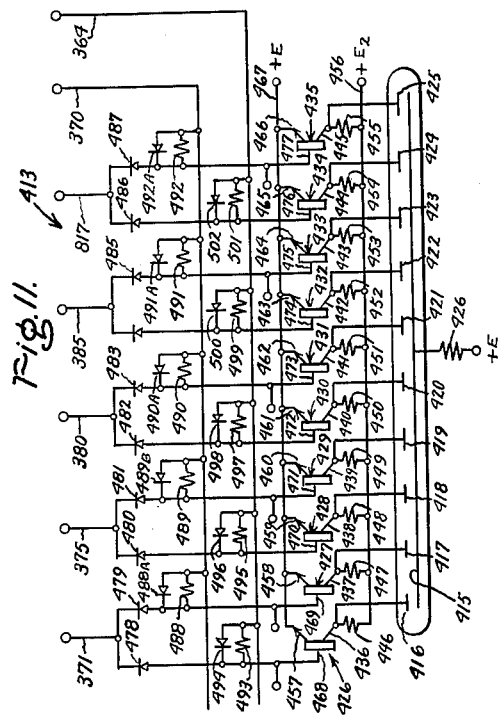
Figure 15:
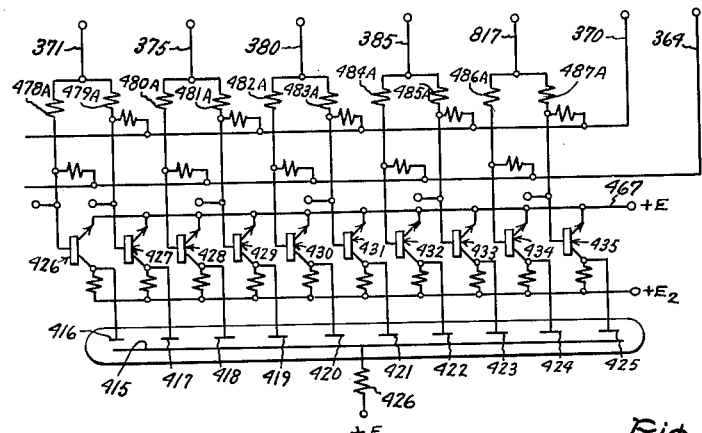
Figure 16:
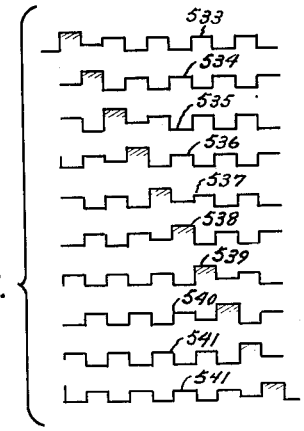
Figure 17:
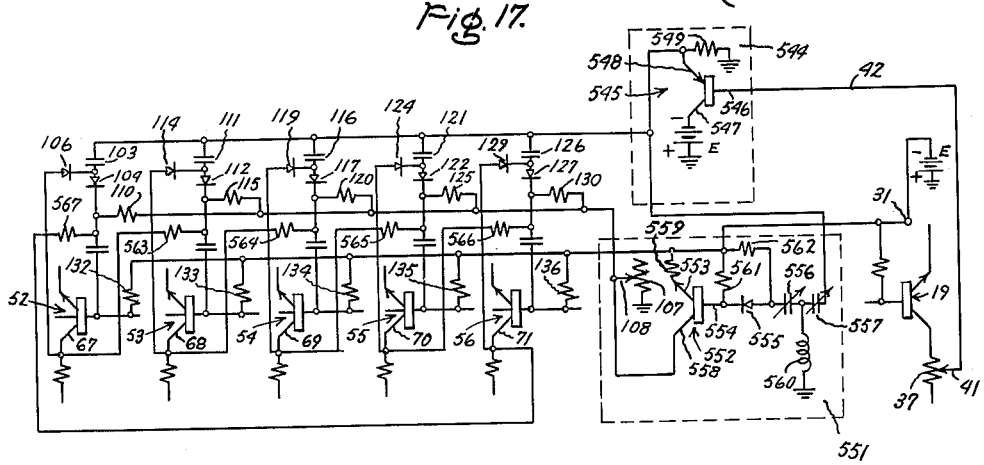

Other and further objects and advantages will appear from a more detailed description of the invention considered in conjunction with the accompanying drawing in which:

FIGURE 1 illustrates schematically the overall counter circuit of my invention,

FIGURE 2 illustrates graphically the potentials at the collectors of the binary and quinary loop transistors in the circuit of FIGURE 1, at different times at which pulses are applied to the input of the circuit, FIGURE 3 illustrates graphically, the potentials derived in the coincidence circuit of the counter of FIGURE 1, FIGURES 4 and 5 illustrate graphically, wave forms of potentials appearing at selected points of the counter in different reset conditions thereof in response to a succession of input pulses, FIGURE 6 represents the neon lamp display array and cover therefor forming a part of the display circuit of one feature of my invention, FIGURE 7 illustrates the arabic numerals 0 through 9 as formed by the display circuit of FIGURE 6, FIGURE 8 is a table indicating which combination of lamps of the neon lamp array are lit to display the numerals 0 through 9, FIGURE 9 is a graphic representation of potentials effective in firing and extinguishing neon lamps in the indicator circuit, FIGURE 10 illustrates wave forms of potentials in the display circuit of the counter, FIGURE 11 illustrates a modified form of display circuit according to my invention, FIGURE 12 illustrates the wave shapes of potentials appearing at points of the circuit of FIGURE 11 in response to a series of input pulses to the counter, FIGURE 13 illustrates a modified form of display circuit shown in FIGURE 11, FIGURE 14 illustrates the wave forms of potentials at points in the circuit of FIGURE 13 in response to a series of input pulses to the counter, FIGURE 15 illustrates a modified form of display circuit shown in FIGURES 13 and 11, FIGURE 16 illustrates the wave forms of potentials at points in the circuit of FIGURE 13 in response to a series of input pulses to the counter, and FIGURE 17 illustrates a counter circuit according to a modification of my invention.

Referring now more particularly to FIGURE 1 of the drawings for a detailed description of my invention, 10 represents generally the entire counter circuit according to one embodiment thereof and includes major circuit components, each enclosed in a dotted rectangle in FIGURE 1 to facilitate identification and ready reference. Such component circuits include a binary circuit 11 which receives input pulses to be counted and delivers one output pulse for every two received; a quinary circuit 12 which is responsive to the output of binary circuit 11 and delivers one output pulse for every five received; an electrical count indicator circuit 13 responsive to both binary and quinary circuits to produce a distinct coincidence output pulse at each of several terminals depending on the circuit count and a visual indicator circuit 14 receiving signals from the coincidence circuit to indicate visually the number of pulses received by the counter 10. In addition to the circuits identified, the counter 10 includes a reset circuit with an isolation section 15 selectively connectable to different output connections of the coincidence circuit, a binary reset section 16 and a quinary reset section 17 which couple the isolation section 15 to binary and quinary sections 11 and 12, respectively, to reset the same at preselected counts.

Binary circuit 11 comprises a pair of transistors 18 and 19, of the N-P-N junction type having respective bases 20 and 21 of semiconducting material with P-type of impurity, respective emitters 22 and 23 and respective collectors 24 and 25 of semiconducting material with N-type of impurity.

For establishing a bi-stable circuit, the electrodes of the transistors of binary circuit 11 are intercoupled and electrically biased to provide two states of stable equilibrium, in each of which state, one transistor is conducting heavily and the other is substantially non-conducting or as otherwise stated, cut-off. To this end, base 20 is connected to collector 25 through a parallel combination of a resistor 26 and a capacitor 27 for applying the potentials developed at collector 25, to the base 20 and base 21 is connected to collector 24 through a parallel combination of resistor 28 and capacitor 29, for applying the potentials at collector 24 to the base 21.

The bases 20 and 21 and the emitters 22 and 23 receive current from and are biased by, a direct potential source, represented by a battery, E, having its negative terminal connected to a line 30 at a terminal 31. Resistors 32 and 33 are interposed between line 30 and respective bases 20 and 21 and a parallel combination of resistor 34 and capacitor 35 is interposed between line 30 and emitters 22 and 23. In a manner well known, the resistors 32 and 33 and resistor 35 are effective in compensating for the effects of elevated temperatures on the transistors by maintaining the transistor base currents within acceptable ranges for proper operation of the counter. Capacitor 34 is effective in providing a low impedance path for alternating currents to maintain the emitters at alternating current ground potential. For deriving binary circuit output potentials, collectors 24 and 25 are connected to ground through respective load resistors 36 and 37, the latter of which is preferably a potentiometer resistor element.

The parameters of binary circuit 11 and the negative potential, —E, at terminal 31, are proportioned so that upon the application of this potential, one of the transistors 18 or 19 becomes conductive and the other becomes non-conductive and the circuit remains in this condition of stable equilibrium until external influences such as positive pulses applied to the bases alter the same. This may be explained as resulting from the fact that this application of the biasing potential to each transistor base and emitter, tends to establish conduction in the collector circuit of each transistor but that due to inherent inequalities in the characteristics of the transistors, one is more responsive than the other to this potential application and therefore, initially conducts to a greater extent. The collector of each transistor is coupled to the base of the other transistor of the binary circuit, and the potential developed across the collector resistor of each transistor in response to current flow therein is negative, or in other words such as to decrease conduction in the other transistor load circuit when applied to its base. The negative potential at the collector of the transistor with the greater initial current conduction exceeds the corresponding potential developed across the load resistor of the other transistor and thus, since the potential at the collector of each transistor is applied to the base of the other of the two transistors, the transistor of lesser current conduction is influenced to conduct even less, resulting in decreased potential across its load resistor. This decreased potential across the load resistor of the lesser conducting transistor is applied to the base of the greater conducting transistor to affect it in a manner to further increase its conduction. Accordingly, a cumulative action occurs in a very short interval of time, at the end of which, one transistor is conducting relatively heavily and the other is substantially non-conducting or in other words, is cut-off.

The circuit remains in this condition, which is stable, until the heavy current conduction of the one transistor is lessened in some manner or conduction in the cut-off transistor is initiated. This is herein achieved by applying a negative electrical pulse to an input terminal 38 which is coupled, in parallel, to bases 20 and 21 through respective capacitors 39 and 40. The effect of such negative pulse is to instantaneously lessen conduction in the heavily conducting transistor across the load resistor of which is therefore developed a positive pulse which in turn is applied to the base of the lesser conducting transistor. The influence of this is to enhance the conduction of the lesser conducting transistor. A cumulative action again occurs in which each transistor develops and applies potentials to the base of the other transistor in the binary circuit tending to change the state of conduction therein. In a very short interval of time a new state of stable equilibrium is reached in which the formerly heavily conducting transistor is cut-off, and the formerly cut-off transistor is heavily conducting.

Each change in condition of conduction of each of the transistors is accompanied by a corresponding potential pulse developed across each load resistor 36 and 37. A positive pulse is produced at each change from a condition of conduction to non-conduction at each transistor collector and a negative pulse is produced at each change from a condition of non-conduction to conduction at each transistor collector. Thus, in response to each two incoming pulses capable of altering the condition of stability of binary circuit 11, a single pulse of positive polarity and a single pulse of negative polarity is produced across each transistor load resistor. For application of pulses at load resistor 37 to the quinary input circuit, potentiometer arm 41 adjustable along resistor 37 is provided for selecting the proper magnitude of the pulse for application to a line 42 leading to the quinary circuit.

The interval of time during which each transistor is transient from one condition of conduction to the other condition of conduction is determined by the time constants of the circuit including the resistors and capacitors thereof. This affects directly the maximum pulse rate at which the binary circuit is operable. Increased response of the circuit, that is, shortening of the mentioned transient interval, may not be achieved beyond a certain value by decreasing the circuit resistance and capacitance values since these must necessarily be sufficiently large to provide adequate switching potential and power output.

As set forth in my copending application, Serial No. 728,281, filed December 22, 1958, and now abandoned, the repetition rate of a binary circuit similar to that of circuit 11 herein, is advantageously increased by the provision of a pair of unilaterally conducting elements, such as diodes, connected between binary transistor bases and being oppositely poled. In accordance with a feature of my invention as set forth herein, the maximum repetition rate of the binary circuit may be even further increased by the provision of a pair of transistors 43 and 44 of the N–P–N type connected between the bases 20 and 21 of binary circuit transistors 18 and 19. The collector 47 of transistor 43 is connected directly to base 20 of transistor 18 and emitter 48 of this transistor is connected directly to base 21 of transistor 19. The collector 50 of transistor 44 is connected directly to base 21 of transistor 19 and emitter 51 of this transistor is connected directly to base 20 of transistor 18. Base 46 of transistor 43 is coupled to base 20 of transistor 18 through parallel connected resistor 46A and capacitor 46B and similarly, base 49 of transistor 44 is coupled to base 21 of transmitter 19 through parallel connected resistor 49A and capacitor 49B.

The inclusion of transistors 43 and 44 is effective to increase the frequency range of the binary circuit by effectively aiding the switching action of the binary circuit transistors 18 and 19. For an understanding of the manner in which this result is achieved, it is noted that in any state of equilibrium of the binary circuit wherein one of the binary transistors 18 and 19 is conducting and the other is non-conducting, the potential appearing at the base of the conducting transistor is somewhat larger in positive value than that at the base of the non-conducting transistor. Under these circumstances, that transistor of the pair 43 and 44 which has its base and collector connected to the base of that one of the transistors 18 and 19 which has the higher potential, and its emitter consequently connected to the base of lower potential, is rendered conducting and the other transistor of the pair 43 and 44 is rendered non-conducting. This condition of transistors 43 and 44 prevails during the time that transistors 18 and 19 remain in the described condition of equilibrium.

In response to an input pulse applied at terminal 38, the conducting transistor of the pair 43 and 44, passes the portion of this pulse which is applied to its base, to its emitter and therefore, to the base of the transistor of the pair 18 and 19 which is non-conducting. As may be readily understood, the pulse so passed, aids the pulse directly applied to the base of the non-conducting transistor of the pair 18 and 19, to aid in switching the transistor and the binary circuit to its other condition. It should also be noted that the non-conductive transistor of the pair 43 and 44 does not pass pulses applied to its base and collector because it is back biased under these circumstances and the portions of the input pulse applied to the emitters 48 and 51 are not transmitted to any other element of the transistor. In response to each change in state of equilibrium of the binary circuit, the bases of transistors 18 and 19 change in relative potential whereby a different base is somewhat higher in direct potential than the other. Consequently, the transistors 43 and 44 similarly change in conditions of conduction for readiness to aid the switching action described.

For a further understanding of this feature of my invention and strictly as an example, it is assumed that binary circuit 11 is in a state of equilibrium in which transistor 18 is conducting and transistor 19 is non-conducting. Thus, base 18 has a potential somewhat greater than the potential of base 19, and therefore, transistor 43 is rendered conducting and transistor 44 is rendered non-conducting. In response to an incoming pulse applied at terminal 38, the pulse divides and is applied through capacitors 39 and 40 to respective bases 20 and 21. The fraction of the pulse applied directly to base 20 is ineffective to cause any changes in circuit equilibrium. It is, however, applied to base 46 and collector 47 of transistor 43 and passed through this transistor to emitter 48 and to base 21 of transistor 19, adding to the fraction of the input pulse applied directly to base 21 to aid the switching action. Because under these circumstances, transistor 44 is back biased, it is unresponsive and does not pass pulses applied to its base and collector.

In the new state of equilibrium wherein transistor 18 is cut-off and transistor 19 is conducting, base 21 is at a somewhat higher potential than base 20 and therefore, transistor 43 is rendered non-conducting and transistor 44 is rendered conducting. Thus, the transistor 44 is maintained in readiness to aid the switching action in response to the next incoming pulse.

Quinary circuit 12 comprises 5 resistors 52, 53, 54, 55, and 56, having respective emitters 57, 58, 59, 60, and 61 of N-type semiconducting material, respective bases 62, 63, 64, 65, and 66 of P-type semiconducting material and respective collectors 67, 68, 69, 70, and 71 of N-type semi-conducting material. Load resistors 72 and 72', having a junction point connected to an output terminal 73 are connected between collector 67 and ground and load resistors 74, 75, 76 and 77 are connected between ground and respective collectors 68, 69, 70 and 71. The quinary circuit transistors have the respective electrodes including emitters, bases, and collectors, biased and intercoupled so as to form a multistable closed loop circuit having 5 states of stable equilibrium, in each of which, one of the transistors is cut-off or non-conducting and the others are conducting. To this end, each of the emitters 57, 58, 59, 60 and 61 have a negative potential, —E, applied thereto from line 30 through the resistor 35. Thus, the quinary circuit emitters are at the same potential as the binary circuit emitters and are effectively, conductively joined. The collector of each quinary circuit transistor is coupled to the base of each other quinary circuit transistor for transferring the pulses developed at the collectors to these other bases. Specifically, collector 67 of transistor 52 is connected to bases 64, 65, and 66 of respective transistors 54, 55, and 56 through respective resistors 78, 79, and 80 and to base 63 of next adjacent transistor 53 in the loop, through parallel connected resistor 81 and capacitor 82; collector 68 of transistor 53 is connected to bases 62, 65, and 66 of respective transistors 52, 55 and 56 through respective resistors 83, 84 and 85 and to base 64 of next adjacent transistor 56 in the loop, through a parallel combination of resistor 86 and capacitor 87; collector 69 of transistor 54 is connected to bases 62, 63, and 66 of respective transistors 52, 53 and 56 through respective resistors 88, 89 and 90 and to base 65 of next adjacent transistor 55 in the loop, through parallel combination of resistor 91 and capacitor 92; collector 70 of transistor 55 is connected to bases 62, 63 and 64 of respective transistors 52, 53, and 54 through respective resistors 93, 94 and 95 and to base 66 of next adjacent transistor 56 in the loop, through parallel combination of resistor 96 and capacitor 97, and collector 71 of transistor 56 is connected to bases 63, 64 and 65 of respective transistors 53, 54 and 55 through respective resistors 98, 99 and 100 and to base 62 of effectively next adjacent transistor 52 in the loop, through parallel combination of resistor 101 and capacitor 102.

It is thus observed that each collector of the quinary circuit transistors is coupled to the base of each other quinary circuit transistor and further, that each collector is uniquely coupled to the base of the next adjacent transistor in the loop, in a certain order around the loop, by a capacitor in parallel with a resistor in such coupling. Thus, the coupling between each collector and the base of the next transistor in one direction around the quinary loop circuit, is enhanced and potentials developed at any collector are more strongly applied to such base due to the increased capacitive coupling between the collector and the base. The consequence of such enhanced coupling is to cause a predetermined and orderly sequence of changing in the states of equilibrium of this circuit, or, in other words, the order of counting in the quinary circuit in response to pulses from the binary circuit which are simultaneously applied to all of the quinary circuit bases, as set forth in more detail hereinbelow.

The pulses produced across load resistor 37 of binary transistor 19 and applied to line 42 are applied to the bases of the several quinary circuit transistors through passive gate circuits which, according to an important feature of my invention, facilitates a more rapid rate in the changes from one state of equilibrium of the quinary circuit to the next state thereof, or in other words, a greater repetition rate of operation of the quinary circuit. Specifically, the line 42 is coupled to base 62 of transistor 52 through a series circuit arrangement of a capacitor 103, a diode 104 having its anode connected to capacitor 103, and a capacitor 105. In accordance with the terminology herein, the anode of a diode is that terminal shown as an arrow and must be positive with respect to the other diode terminal, named the cathode, and shown as a straight line, for relatively heavy conduction of the diode. For properly biasing diode 104, a diode 106 having its anode connected to collector 67 and its cathode connected to the anode of diode 104, is provided. For also determining the bias on diode 104, a potential is derived from a potentiometer having its resistive element 107 connected between line 30 and ground. A movable arm 108 contacts the resistive element 107 for controlling the magnitude of potential applied to a line 109 connected to the arm, and a resistor 110 is connected between this line and the cathode of diode 104. Similarly, in the circuit of transistor 53, capacitor 111, diode 112 and capacitor 113 are serially connected between line 42 and base 63 of the transistor, with the anode of diode 112 connected to capacitor 111. For biasing diode 112, a diode 114 has its anode connected to collector 68 and its cathode connected to the anode of diode 112. Bias potential for diode 112 is also derived from a resistor 115 connected between the line 109 and the cathode of diode 112. In the circuit of transistor 54, capacitor 116, diode 117 and capacitor 118 are serially connected between line 42 and base 64 of transistor 54, with the anode of diode 117 connected to capacitor 116. A diode 119 has its anode connected to collector 69 and its cathode connected to the anode of diode 117 for applying a potential bias thereto. A resistor 120 is connected between the line 109 and the cathode of diode 117 for also applying a bias to this diode. In the circuit of transistor 55, a capacitor 121, a diode 122 and a capacitor 123 are serially connected between line 42 and base 65 of the transistor 55, with the anode of diode 122 connected to capacitor 121. For biasing diode 122, a diode 124 has its anode connected to collector 70 and its cathode connected to the anode of diode 122. For other biasing, a resistor 125 is connected between the line 109 and the negative terminal of diode 122. Lastly, in the circuit of transistor 56, a capacitor 126, a diode 127 and a capacitor 128 are serially connected between line 42 and base 66 of the transistor 56, with the anode of diode 127 connected to capacitor 126. A diode 129 has its anode connected to collector 71 and its cathode connected to the anode of diode 127 for biasing this diode. A resistor 130 is connected between the line 109 and the cathode of diode 127 for also applying a potential bias to this diode.

As hereinabove explained, a potential bias is applied to the respective diodes 104, 112, 117, 122 and 127 in the respective transistor circuits and such bias is determined on the one hand by the potential of the collector of the transistor in which the diode is in immediate circuit arrangement and on the other hand by the potential applied to line 109 as determined by the position of potentiometer arm 108 on resistor 107. Each of these diodes is effectively connected in series with another one of the diodes 106, 114, 119, 124 and 129 and the collector potential is applied to one side of this connection while the potentiometer potential is applied to the other side of this connection. The potential selected by the arm 108 is of greater negative value than the potential of a non-conducting quinary circuit transistor collector but is of lesser negative value than the potential of a conducting quinary circuit transistor collector. Thus, that diode of the group 104, 112, 117, 122 and 127 which is in immediate circuit with a cut-off transistor is biased somewhat in the forward direction with its anode more positive than its cathode and the others of these diodes are biased in a reverse direction. Strictly as an example, assuming that transistor 52 is non-conducting and that transistors 53, 54, 55 and 56 are conducting, the potential at collector 67 is less negative than the potential on line 109 under these circumstances and the anode of diode 104 is consequently more positive than its cathode. This follows because the potential of line 109 is applied to the cathode of diode 104 and the relatively higher potential of collector 67 is applied to the anode of diode 106 and therefore, also to the anode of diode 104. Also, the potentials of collectors 68, 69, 70 and 71 are more negative than line 109 and diodes 112, 117, 122, and 127 are, therefore, biased in a negative direction with their anodes more negative than their cathodes. It is thus observed that the pulses from binary circuit 11 and applied to the anodes of diodes 104, 112, 117, 122 and 124 in the input of quinary circuit 12 from line 42, readily pass the forward biased diode but are blocked or are greatly lessened in effectiveness by the reverse biased diodes. Accordingly, the output pulses of binary circuit 11 are relatively impotent in directly affecting the circuits of the conducting transistors and are very effective in altering the condition of conduction of the non-conducting transistor. In the absence of this improved circuit arrangement, the pulses applied from the binary circuit 11 to the respective bases of the quinary circuit transistors have somewhat of a tendency to main conduction in the transistor next adjacent to that which is cut-off, and the pulse applied from the collector of the cut-off transistor in response to its change from a condition of non-conduction to conduction, to the base of the next adjacent transistor for changing that next adjacent transistor from a condition of conduction to non-conduction is therefore somewhat less in effectiveness. It is accordingly observed that in accordance with the presently described improvement, a greater effectiveness of this pulse applied from the collector of the non-conducting transistor to the base of the next adjacent transistor in the loop is achieved. It is to be noted also, that it is within the purview of my invention to replace each of the diodes 104, 112, 117, 122, 127, 106, 114, 119, 124 and 129 with an appropriate resistor. However, in the use of resistors rather than diodes, although improved switching action is achieved in the manner described with respect to the provision of diodes the effectiveness of control and the maximum repetition rate of the circuit is somewhat lessened.

In accordance with another feature of my invention, improved temperature stability of the quinary circuit may be achieved by applying biasing potentials to each of the bases of the respective quinary circuit transistors and by applying a negative feedback from each collector of each of these transistors, to the bases thereof. Specifically, respective resistors 132, 133, 134, 135 and 136 are connected between line 30 and respective bases 62, 63, 64, 65 and 66 to apply a negative bias to each of these bases. Also, resistors 137, 138, 139, 140 and 141 are connected between the base and collector of respective transistors 52, 53, 54, 55 and 56. In accordance with this temperature compensation feature of my invention, a certain gain in the quinary circuit is lost. However, it is observed that the circuit is improved in stability and accurate operation at temperatures greater than in which the circuit is operable without these provisions. The bases of the respective transistors are operated at more consistent and better controlled potential levels than without the resistors for providing such a bias.

A more complete understanding of the entire counter circuit, as thus far described and shown in FIGURE 1 of the drawings, may be had by reference to FIGURE 2, illustrating the respective wave shapes of typical input signal potentials and potentials at transistor collectors in the operation of the counter circuit. The wave 142 represents a series of typical, positive, incoming pulses applied to the input of the counter circuit at terminal 38 and is shown as being a series of rectangular waves of equal magnitude and duration and occurring at evenly spaced time intervals $t_0$, $t_1$, $t_2$, etc. with respect to each other. This is merely for purposes of simplicity and clarity in explanation, it being understood, however, that the input pulses may be of peaked or other wave shape and that the same may be of different magnitude and duration and be spaced at virtually any random or different intervals of time, it being necessary only that the input pulses be in the proper amplitude range so as to properly trigger the binary circuit. Wave 143 represents the potentials appearing at collector 24 of transistor 18 in response to the series of input pulses of wave 142 and wave 144 represents the potentials appearing at collector 25 of transistor 19 in response to this series of input pulses of wave 142 and waves 145, 146, 147, 148 and 149, respectively, the potentials appearing at collectors 67, 68, 69, 70 and 71 of respective transistors 52, 53, 54, 55 and 56 of quinary circuit 12.

Assuming as an initial condition that prior to time $t_0$, transistors 18 and 56 are cut-off and that at this time all other transistors, that is, transistors 52, 53, 54, 55 and 19 are conducting, a pulse at time $t_0$ renders transistor 19 non-conducting and transistor 18 conducting. This is represented in waves 143 and 144 wherein the potential of collector 24 at time $t_0$ on wave 143 suddenly increases negatively to a maximum value, and at this time, the potential of collector 25 of transistor 19 suddenly decreases to its minimum negative value. The sudden rise in potential of collector 25, that is, the sudden change from a large negative value to a lesser negative value, provides a positive output pulse through output arm 41 and line 42, to be applied to all of the bases of the quinary circuit transistors. However, the non-conducting transistor 56 is more responsive to this pulse than any other transistors, particularly by reason of the novel input coupling circuits hereinabove described whereby transistor 56 is suddenly rendered conducting and the potential of its collector 71, as illustrated by wave 149, suddenly changes to a maximum negative value. Simultaneous with the initiation of conduction in transistor 56, conduction in transistor 52 is terminated, as represented by the sudden decrease in negative value of collector 67 potential, at time $t_0$ of wave 145. This is facilitated by reason of the greater coupling between collector 71 and base 62 as also hereinabove described. At time $t_1$, the next input pulse is applied at terminal 38 whereby the condition of equilibrium in the binary circuit is again altered, this time to render transistor 18 non-conducting and transistor 19 conducting, as represented by waves 143 and 144, to produce a negative potential pulse at collector 25 of transistor 19. Such a negative pulse is ineffective in producing any change in the quinary circuit and the quinary circuit equilibrium remains the same as observed by the waves 145-149. In response to the third input pulse at time $t_2$, however, the change in the state of equilibrium in binary circuit 11 wherein transistor 18 is rendered conducting and transistor 19 is rendered non-conducting, again produces a positive potential pulse in the binary circuit output which is applied to the quinary circuit bases. Such a pulse alters the condition of conduction of the quinary circuit so that transistor 52 is rendered conducting as shown by the increase in negative potential of collector 67 at time $t_2$ on wave 145 and simultaneously, transistor 53 is cut-off, as shown at this time on wave 146 by its sudden decrease in negative value.

In a manner similar to that hereinabove described, the sequence of input pulses applied to the binary circuit bases through contact terminal 38 is effective to produce a change in the state of equilibrium of the binary circuit in response to each incoming pulse. However, the binary circuit produces only a single positive pulse to be applied to the quinary circuit bases in response to each two incoming pulses and therefore, the change in state of equilibrium occurs in the quinary circuit in response to only each two incoming pulses. Thus, as is seen by waves 147, 148 and 149, transistors 54, 55 and 56 are sequentially rendered non-conducting in response to pulses received at times $t_4$, $t_6$, and $t_8$, and at time $t_9$ the entire circuit is placed in a condition of equilibrium existing just prior to time $t_0$ and in response to further incoming pulses, the sequence hereinabove described is repeated.

For producing potentials indicative of the number of input pulses applied to the binary circuit bases or in other words, to indicate electrically the number of count of the circuit, according to another feature of my invention herein, provision is made for combining the potential appearing at each quinary circuit transistor collector with the potential at each of the binary circuit transistor collectors in coincidence circuit 13. To this end, diodes are serially connected back to back in pairs with anodes of each pair conductively joined and cathodes of each pair connected, respectively, to different combinations of binary and quinary circuit collectors. Thus, diodes 150 and 151 are connected serially back to back with anodes joined and with respective cathodes of the diodes connected to collectors 25 and 67.

Similarly, the cathodes of diode pair 152 and 153 are connected to respective collectors 24 and 67, cathodes of 154 and 155 to collectors 25 and 68, cathodes of 156 and 157 to collectors 24 and 68, cathodes of 158 and 159 to collectors 25 and 69, cathodes of 160 and 161 to collectors 24 and 69, cathodes of 162 and 163 to collectors 25 and 70, cathodes of 164 and 165 to collectors 24 and 70, cathodes of 166 and 167 to collectors 25 and 71 and cathodes of 168 and 169 to collectors 24 and 71 with the cathode of the first mentioned diode of each pair connected to the first mentioned cathode of each pair. The common joined anodes of the respective diode pairs 150 and 151, 152 and 153, 154 and 155, 156 and 157, 158 and 159, 160 and 161, 162 and 163, 164, and 165, 166 and 167, and 168 and 169 are connected to ground through respective resistors 170, 171, 172, 173, 174, 175, 176, 177, 178, and 179 and these same joined terminals are also connected to respective contacts 0, 1, 2, 3, 4, 5, 6, 7, 8 and 9 of a selector switch 180.

The common terminal of each pair of joined diodes assumes a potential substantially equal to the maximum of negative potentials applied to the two diodes from the respective collectors. Thus, if one collector of the two connected to a pair of diodes is at a high negative value and the other is at a relatively low negative value, the diode junction potential is that of the high negative value. If both such collectors are at the same high negative value, or if both are at a low negative value, the junction potential is substantially that applied from the collectors. As hereinabove explained, for each count of the entire decade circuit 10, a transistor of the binary circuit and a transistor of the quinary circuit are conducting and the collector potentials of the conducting transistors are of a relatively high negative value while the collector potentials of the non-conducting transistors are of a relatively low negative value.

As already explained, in coincidence circuit 13, the ten junctions of anodes of the ten pairs of diodes are coupled through these diodes to the collectors of the binary and quinary circuit transistors to combine the potential of a binary circuit transistor collector with the potential of a different quinary circuit transistor collector at each contact. Thus, since for each condition of equilibrium one binary and one quinary circuit transistor has a low collector potential, a different one of these contacts has applied thereto a unique minimum negative potential, indicative of the number of count of the circuit as the circuit receives a succession of input pulses. This is illustrated in FIGURE 3 of the drawings, wherein the potentials at contacts 0, 1, 2, 3, 4, 5, 6, 7, 8 and 9 of switch 180 at the different periods of time during which input pulses are applied to the circuit are represented by waves 180, 181, 182, 183, 184, 185, 186, 187, 188, 189 and 190, respectively. For zero count contact 0 of switch 180 is of unique minimum negative potential as shown by wave 181; for count one, contact 1 is of unique minimum potential shown by wave 182, etc. This result is achieved because the potentials applied to the respective contacts depend upon the count of the circuit 10. For each count, one of the binary circuit transistors and one of the quinary circuit transistors are cut-off, resulting in minimum negative potentials at the collectors of these transistors and these potentials are simultaneously applied to the same contact of switch 180. All other contacts are connected to one or two transistor collectors with maximum negative potentials appearing at the corresponding switch contact.

As an example, for zero count, transistors 52 and 19 are cut-off, producing minimum negative potentials at their collectors 67 and 25. Also, for zero count, all other transistors are conducting whereby their collectors are at maximum negative potentials. Accordingly, for this count, contact 0 of switch 180 has a minimum negative potential applied thereto from both collector 25 through diode 150 and from collector 67 through diode 151. Contact 1 has this minimum negative potential applied thereto from collector 67 through diode 153 and contacts 2, 4, 6 and 8 have this minimum negative potential applied thereto from collector 25 through diodes 154, 158, 162 and 166. However, these contacts also have maximum negative potential applied thereto through the other diodes of coincidence circuit, as, for example, diode 152 connected to collector 24 of transistor 18. Contacts 3, 5, 7 and 9 each have the maximum negative potential applied thereto through each diode connected thereto. Thus, for zero count, the contacts other than 0 contact have maximum negative collector potentials applied thereto and contact 0 has a unique minimum negative potential.

For count 1, in similar manner, collectors 24 and 67 are at unique minimum potentials whereby only contact 1 at switch 180 has applied thereto a minimum negative potential from these collectors, through respective diodes 152 and 153. In this manner, and as shown in FIGURE 3, for each count, only one contact of the switch has a unique minimum potential applied thereto and all others are at maximum negative potentials. Such a unique minimum potential is useful for electrically indicating the count of the circuit.

According to a feature of my invention, the use of the diodes of coincidence circuit 13 for coupling the potentials at respective binary and quinary circuit transistor collectors facilitates the production of an output pulse equal in magnitude to the full difference between the potentials of the transistors in the conducting and non-conducting states of equilibrium. Such a pulse is of substantial magnitude, in most cases obviating subsequent amplification thereof for application to other circuit components for other circuit functions.

According to another feature of my invention, novel provision is made for resetting the counter to zero count or to any other count by applying appropriate pulses to selected binary and quinary circuit transistor bases through binary and quinary reset circuits section 16 and 17. Reset pulses of negative polarity may be derived from the coincidence circuit and may be applied through switch 180 to line connection 191, which leads to circuit sections 16 and 17, by connecting terminals 204 and 205. The negative pulses are produced by the negative going edge of the wave produced at a diode junction by reason of a collector potential changing to its maximum negative value just subsequent to its being at minimum negative value coincident with a collector potential of minimum negative value applied to the other diode of the pair.

In binary reset circuit section 16, the line 191 is connected through a capacitor 192 and a diode 193 having its cathode connected to the capacitor 192, to a movable arm 194 of a selector switch 195. The arm 194 is movable to contact any one of switch contacts "off" and 1, 2, 3, 4, 5, 6, 7, 8 and 9 shown arranged in a line but which in actual practice, may conveniently be along the arc of a circle of radius equal to the length of arm 194. For enabling negative pulses to pass through diode 193 and to simultaneously block positive pulses, the diode 193 is biased negatively by a direct negative potential, $-E$, from a source represented by a battery applied to the cathode of the diode through a resistor 196 and a resistor 197 connected between this cathode and ground forming a potential divider. Contacts 0, 2, 4, 6 and 8 of switch 195 are connected to base 21 of transistor 19 for application of negative pulses to this base by the setting of arm 194 of switch 195 on any one of these contacts and contacts 1, 3, 5, 7 and 9 of this switch are connected to base 20 of transistor 18 for application of negative pulses to this base by the setting of arm 194 of switch 195 on any one of these contacts.

In quinary reset circuit section 17, which is similar to circuit section 16, the line 191 is connected through a capacitor 198 and a diode 199, having its cathode connected to the capacitor 198, to a movable arm 200 of a selector switch 201. The arm 200 is movable to contact any one of its switch contacts "off" and 1, 2, 3, 4, 5, 6, 7, 8 and 9 shown arranged in a line but which in actual practice, may also be conveniently be along the arc of a circle of radius equal to the length of arm 200. For enabling negative pulses to pass through diode 199 and to simultaneously block positive pulses, the cathode of diode 199 is biased negatively by a direct negative potential, $-E$, from a source represented by a battery, applied to the cathode of the diode through a resistor 202 and a resistor 203 connected between this cathode and ground, forming a potential divider. Contacts 0 and 1 of switch 201 are connected to base 62 of transistor 52 for application of negative pulses to this base for the setting of arm 200 of switch 201, on either one of these two contacts. Contacts 2 and 3 of switch 201 are connected to base 63 of transistor 53 for selective application of negative pulses to this base for the setting of the arm 200 on either one of these two contacts, contacts 4 and 5 are connected to base 64 of transistor 54 for the application of negative pulses to this base for the positioning of the arm 200 on either one of these two contacts, contacts 6 and 7 are connected to base 65 of transistor 55 for the selective application of negative pulses to this base for the setting of the arm 200 on either one of these two contacts and contacts 8 and 9 are connected to base 66 of transistor 56 for the application of negative pulses to this base for the setting of the arm 200 on either one of these two contacts. Arms 194 and 200 of switches 195 and 201 are mechanically interconnected with arms 194 and 200 on similar switch numbers for unicontrol, as indicated by the dotted line extending therebetween.

The resetting pulses applied to line 191 may be derived from an external source and applied to a contact 204 or, alternatively, this contact may be directly connected to a contact 205 leading to isolation circuit section 15, which, in cooperation with other circuitry, is effective to deliver resetting pulses.

Isolation circuit section 15 includes a transistor 206 having a base 207, an emitter 208 and a collector 209. The base 207 of transistor 206 is conductively connected to the movable arm 210 of the selector switch 180 and a resistor 211 is connected between base 207 and ground. A negative direct potential, $-E$, from a source, represented by a battery, is applied to emitter 208 through a resistor 212 from a terminal 213 and collector 209 is directly connected to ground. In the isolation circuit section 15, negative pulses from an external source may be applied to a terminal 214 which is connected through a capacitor 215, to the external contact marked "Ext" on switch 180. The external contact on switch 180 is further connected to the terminal 213 for applying negative potential, $-E$, through a resistor 216 to maintain base 207 at approximately the same average potential when arm 210 is on "Ext" as when it is on 0 through 9 position.

It is to be observed that switch 180 is adaptable to select resetting pulses from any one of the contacts thereof. At external contact "Ext," the pulses are derived from some external source while at contacts 0 through 9, the pulses are derived from the junctions of coincidence circuit diode pairs in the manner hereinabove explained. These pulses, wherever they may be derived, are applied through the movable arm 210 of switch 180 to the base 207 of transistor 206 and appear across resistor 212 in the emitter circuit of transistor 206 and are of the same polarity as the pulses appearing at base 207. The input circuit of transistor 206, that is, the base circuit, is of high impedance and the output circuit, that is, the emitter circuit, is of low impedance and thus, the isolation circuit section 15 serves as an "emitter follower," adaptable to transmit the pulses applied thereto of the same polarity but with low power input and with much greater power output. Thus, the coincidence circuit components are only lightly loaded and considerable power for the operation of the reset circuit sections 16 and 17, is delivered by reason of the insertion of isolation circuit section 15.

As explained hereinabove, the application of a negative pulse of sufficient magnitude to any one of the bases of the transistors of binary circuit 11 or quinary circuit 12, is effective to terminate conduction in that transistor, if it is conducting. Thus, by proper positioning of switch arms 194 and 200 of switches 195 and 201, respectively, and the application of a suitable resetting pulse to line 191, the counter 10 may be reset to any count desired. For example, with arms 194 and 200 on contacts 4 of the respective switches 195 and 201, the application of a negative pulse to line 191 is effective to terminate conduction in transistors 19 and 54 to reset the counter to count number 4.

For producing a staircase potential wave shape wherein successively increased potentials are produced in response to a succession of input pulses into the counter 10, a line 218 having an output terminal 217' is connected to the collectors 67, 68, 69 and 70 in the quinary circuit through the respective adjustable resistors 218, 219, 220 and 221 and to collector 25 in the binary circuit through adjustable resistor 222. These resistors are set at progressively greater values of resistance and may be empirically determined to produce desired potential decrements in each of the steps of the wave shape.

The staircase wave shape shown at bottom of FIGURE 3 is produced at terminal 218 in response to ten successive pulses applied to the input of the counter circuit 10. For an understanding of the manner in which the wave shape is produced, it is again noted that the transistors of binary and quinary circuits of counter circuit 10 have very low collector potentials in the cut-off condition thereof and relatively high negative potentials in the conductive condition thereof. Although in the cut-off condition of the transistors a certain very low current passes therein producing a small collector potential, for purposes of brevity and simplicity of explanation, it may be assumed that in the cut-off condition, the collector potentials are zero and that in the conductive condition, the collector potentials are some negative potential, $-e_c$. Thus, a zero count, with transistors 19 and 52 cut-off and all other transistors in the binary and quinary circuits conducting, potentials at collectors 25 and 67 of transistors 19 and 52 are zero and collectors 68, 69, 70, 71 and 24 are at potential $-e_c$. Since collector 24 plays no direct part in producing the staircase potential wave, no further consideration will be given thereto in the present explanation. Accordingly, at zero count, a potential difference exists between each of the collectors 68, 69, 70 and 71 and ground. In addition to the electron current path through the load resistors of each of these transistors as described hereinabove, an alternate electron current path exists from these collectors through respective resistors 219, 220, 221 and 222, effectively in parallel with each other to line 217 and from this line through resistor 218 to collector 67 and finally from this collector to ground through load resistors 72 and 72' in the load circuit of transistor 52. The potential difference between one end of resistor 218 and ground, therefore, is applied to line 217 and may be taken as a reference or initial potential. This potential is shown as being the value occurring between times $t_0$ and $t_1$ on potential wave 223 in FIGURE 3. At time $t_1$ when the second input pulse is applied to the counter, the potential of collector 25 of transistor 19 increases to $-e_c$. Thus, another parallel electron current path from collector 25 through resistor 222 to line 217 is formed for supplying current to resistor 218. Accordingly, a lesser proportion of the potential, $-e_c$, is dropped across the effectively parallel connected resistors 219, 220, 221 and 222 and a greater proportion is dropped across resistor 218. This is represented by the increased negative potential from time $t_1$ to time $t_2$ on potential wave 223 in FIGURE 3 to form the second step of the waves. In response to the third input pulse to the counter, transistors 19 and 53 are cut-off and transistors 52, 54, 55 and 56 are conducting. In this condition, an effective parallel electron current path from collectors 67, 69, 70, 71 and 25 which are at potential, $-e_c$, is established through respective resistors 218, 220, 221 and 222 to line 217. From line 217, a current path through resistor 219 to collector 68 and to ground through load resistors 74 exists. Resistor 219 is of sufficiently greater resistance than resistor 218, that the proportion of potential, $-e_c$, appearing at line 217 is greater than at times $t_1$ to $t_2$ whereby an increased potential is applied to line 217 as appears at times $t_2$ to $t_3$ on wave 223 in FIGURE 3. Thus, the third step of the wave is formed.

In a manner entirely similar to that described, the other steps of the wave 223 are formed in response to successive input pulses. At time $t_{10}$ and in response to the eleventh input pulse, the staircase wave suddenly decreases to the value at time $t_0$ and the wave form is cyclical in response to each ten input pulses as shown.

It should be noted that no direct connection is made between collector 71 of transistor 56 and line 217 since such a connection is unnecessary for producing the last two steps of the staircase potential at counts eight and nine. For count eight, transistor 19 is nonconducting with relatively low collector potential and for count nine it is conducting with relatively high collector potential. For each of these counts, transistors 52, 53, 54 and 55 are each conducting with relatively high potentials at their respective collectors. Accordingly, at count eight, electron current flows from the relatively high negative potential collectors 67, 68, 69 and 70 to relatively low potential collector 25 through respective resistors 218, 219, 220 and 221, effectively in parallel, to line 217 and from this line to relatively low potential collector 25 of transistor 19 and from this collector to ground through resistor 37. Thus, the potential developed by current passing through resistor 222 produces the penultimate step of the wave. For count nine, the potential of collector 25 of transistor 19 is relatively high, or in other words, is substantially equal to the potential at collectors 67, 68, 69 and 70 which are connected to line 217. The low potential collector 71 is not connected to the line. Accordingly, the potential of collector 25 is applied to line 217 in parallel with the potentials appearing at collectors 67–70. In the latter circumstance, line 217 effectively "floats" at a potential of these collectors, less slight losses.

As hereinabove pointed out, by the control provided by switches 195 and 201, reset pulses may be directed to selected ones of the binary and quinary circuit bases to reset the counter to any desired count. In accordance with another feature of my invention, the counter may be cyclically operated whereby it automatically resets to a pre-determined count number after any other pre-determined number of incoming pulses. Purely as examples, the counter may be reset to zero count after any number of input pulses, one to ten, or it may be reset to number 3 count, after each series of 1 to 10 additional input pulses. This result is achieved by interconnecting terminals 204 and 205 and by proper positioning of switches 180, 195 and 201. Switch 180 is positionable to determine the count number at which reset pulses are delivered through isolation circuit section 15, and switches 195 and 201 determine the count number to which the count circuit is reset in response to the reset pulse so produced and delivered.

As may readily be understood, the number of combinations of switch positions is too large for a detailed description of the circuit operation for each. However, for a better understanding of this feature of my invention, the operation of the circuit is set forth and described hereinbelow with respect to some representative positions of switches 180, 195 and 201. In the "0" position of each of these switches, the counter circuit is "frozen" whereby it is totally unresponsive to any of the input pulses applied thereto. This may be clearly understood inasmuch as this combination of switch positions indicates that the circuit resets to zero count in response to any incoming pulse. Accordingly, for a series of incoming pulses, the counter produces no output or time varying wave shapes at any points thereof. In the "0" position of switches 195 and 201 and the "1" position of switch 180, however, the counter resets to zero count after one input pulse has been received or in other words, in response to the second input pulse. The conditions existing in the counter are graphically illustrated in FIGURE 4 of the drawings, wherein 224 and 225 represent, respectively, the potentials at collectors 24 and 25 of binary circuit transistors 18 and 19; 226, 227, 228, 229 and 230 represent the potential wave shapes at each of the collectors 67, 68, 69, 70 and 71 of the quinary circuit transistors; 231 and 232 represent the potential wave shapes at contacts 0 and 1 of switch 180, lines 233 and through 240 represent the potential wave shapes at contacts 2 through 9 of switch 180 and wave 241 represents the potential wave shape at staircase output terminal 217'. From these wave shapes, it may be seen that from an initial zero count, in response to the first input pulse at time $t_1$, the condition of stability of the binary circuit changes and that the condition of stability of the quinary circuit remains unchanged. This is the usual operation of the counter as described hereinabove. This action produces a positive pulse at contact 1 of switch 180 due to the new combination of collector potentials of cut-off transistors 18 and 52 applied thereto and a negative pulse is applied to contact 0 of the switch also due to the negative potential change at collector 25 of transistor 19. The positive pulse applied to contact 1, however, is ineffective to produce any further changes in this counter circuit 10 since the quinary circuit transistors are responsive to negative pulses only. In response to the next incoming pulse, however, the negative pulse produced at collector 25 of transistor 19 due to termination of conduction therein, appears at contact 1 of switch 180 whereby this pulse is applied to the reset circuit to reset the counter to zero count and therefore establish the same potentials in the counter circuit as exist at zero count. Thus, the quinary circuit which otherwise would be responsive to such a second pulse to alter its condition of equilibrium to that in which transistor 53 is rendered cut-off and all other quinary transistors are conducting, remains "frozen" and reset continually occurs before any such quinary circuit changes take place. This results in a steady potential at each of the quinary circuit transistor collectors as shown by lines 226, 227, 228, 229 and 230 and the steady potential exists at contacts 2 through 9 of switch 180 as represented by lines 233 through 240. Staircase potential wave shape 241 has one step or potential decrement before reset which occurs after the first input pulse.

In the position of switch 180 on contact 2 and switches 195 and 201 on contact 0, the circuit resets to zero count after every two input pulses. Under these circumstances, as shown in FIGURE 4, waves 224A and 225A represent potentials at collectors 24 and 25 of the binary circuit transistors 18 and 19, respectively, waves 226A and 227A represent potentials at collectors 67 and 68 of quinary circuit transistors 52 and 53, respectively, lines 228A, 229A and 230A, represent steady potentials at collectors 69, 70 and 71 of quinary circuit transistors 54, 55 and 56, respectively, waves 231A, 232A and 233A represent potentials at contacts 0, 1 and 2, respectively, of switch 180, lines 234A through 240A represent the steady potentials at contacts 3 through 9, respectively, of switch 180 and wave 241A represents the wave form at staircase output terminal 218.

It is to be observed that from $t_0$ to time $t_2$, the waves 224A through 241A are identical in shape to corresponding waves 224 through 241 since all functions in the counter circuit 10 prior to the second incoming pulse are the same irrespective of the setting of switch 180. However, at time $t_2$ and in response to the second incoming pulse, the circuit does not reset with switch 180 on contact 2. Through the usual operation of the counter, the state of equilibrium of the quinary circuit is changed to that in which transistor 53 is cut-off and all other quinary circuit transistors are conducting. This is indicated on waves 226A and 227A at time $t_2$ wherein the respective collectors of transistors 52 and 53 suddenly fall and rise, respectively. Also, in response to the second incoming pulse, transistor 18 is rendered conducting and transistor 19 is cut-off as shown by waves 224A and 225A. Thus, at time $t_2$, contact 2, which derives its potential from collectors of transistors 19 and 53, has a positive potential pulse applied thereto. This is indicated at wave 233A. The next incoming pulse is effective to trigger transistor 19 into conduction, which applies a negative resetting pulse to contact 2 of switch 180 and the counter resets to the count determinable by switches 195 and 201, for the present explanation taken to be zero count. The potentials of collectors 69, 70 and 71 of transistors 54, 55 and 56 and of contacts 3 through 9 of switch 180 remain "frozen" or in other words at a steady or constant value. The staircase potential wave 241A indicates reset after the second downward step of the wave.

In a manner entirely similar to that described, the operation of the counter and the potentials produced at different points thereof may be determined for other settings of the respective switches. Without detailed explanation, the wave shapes at the collectors of transistors 18, 19, 52, 53, 54, 55 and 56, contacts 0 through 9 of switch 180 and staircase output terminal 217A are indicated at groups of waves 224B through 241B, 224C through 241C, 224D through 241D, 224E through 241E, 224F through 241F, 224G through 241G and 224H through 241H for the position of switches 195 and 201 on contact 0 and with switch 180 on respective positions 3 through 9.

It is further noted that the counter 10 "freezes" when switch 180 is positioned on the same numbered contact as switches 195 and 201 and that under other circumstances, the reset of the circuit may occur at any number of count in response to a predetermined number of additional incoming pulses, and further that the reset need not necessarily be to a lower numbered count than that at which the reset pulses occur. Thus, for example, the reset may occur at a count number such as 3 and the counter be reset to a number such as 8.

A further appreciation of the function and operation of the counter circuit 10 in response to different positions of the switches 180, 195 and 201 may be had by reference to FIGURE 5 of the drawings, illustrating representative wave shapes of potentials at certain points of the counter for positions of switches 195 and 201 other than 0. Thus, with coincidence switch 180 positioned on contact 0 and reset switches 195 and 201 on contact 1, as shown in this figure, wave 260 represents the potential at collector 24 of binary transistor 18; waves 261, 262, 263, 264 and 265, represent, respectively, the potentials at collectors 67, 68, 69, 70 and 71 of quinary transistors 52, 53, 54, 55 and 56; waves 266, 267, 268, 269, 270, 271, 272, 273, 274 and 275 represent, respectively, the potentials appearing at contacts 0 through 9 of coincidence circuit switch 180 and wave 276 represents the staircase wave form at staircase output terminal 217'. In this combination of switch positions, the counter is reset to count 1 each time a reset pulse is produced at contact 0 of the coincidence switch 180. Thus, a full ten counts or input pulses are required to produce reset.

Wave forms 260A through 276A represent the potentials at points corresponding to those at which potential wave forms 260 through 276 appear for the condition in which coincidence switch 180 is set on contact 4 and reset switches 195 and 201 are set on contact 1. In this condition it is noted that reset of the counter to count 1 is produced each time a reset pulse is produced at contact 4 of switch 180 or, in other words, after each 3 incoming pulses.

Still another group of wave forms 260B through 276B represent the potentials at these points of the counter in response to a succession of incoming pulses under the condition wherein coincidence switch 180 is positioned on contact 2 and reset switches 195 and 201 are positioned on contacts 4 thereof. As observed from these wave forms, the counter circuit is reset to count 4 each time a reset pulse is produced at contact 2 of switch 180.

In the operation of my counter, as shown in FIGURE 1 of the drawings, wherein it is reset to zero count after ten incoming pulses, terminals 204 and 205 are not connected and reset pulses for resetting the decade are supplied by an external source and applied to terminal 204. The output from coincidence circuit 13 may be taken from any contact 0 through 9 of switch 180 or from contact 205 with switch arm 210 of switch 180 engaging one of the contacts 0 through 9 of that switch. In the latter case, such output pulses pass through isolation transistor 206.

For special presetting and resetting of the counter to predetermined counts, terminals 204 and 205 are interconnected and switches 195 and 201 are set at the count at which it is desired to reset the counter. In this circumstance, the counter may be reset in response to pulses applied to terminal 204 from an external source or from pulses derived in the coincidence circuit and selected by switch 180. In the case of externally applied pulses, the effectiveness thereof is somewhat lessened by the application thereof to isolation section 15, as well as to reset sections 16 and 17. However, the losses in section 15 are relatively insignificant and the counter may be operated entirely satisfactorily with reasonable amplitude reset pulses despite such losses.

It is to be understood that with terminals 204 and 205 interconnected and reset pulses derived from coincidence circuit 13, the counter 10 may be adjusted for operation as a decade counter in which it divides by the number 10, by setting switches 195 and 201 on contact 0 and switch 180 on contact 9. By positioning switch 180 on any other of the contacts, it is responsive to other numbers of input pulses from one to nine to produce an output pulse and thus, divides by such other number.

In accordance with still another feature of my present invention, provision is made in the display circuit designated generally at 14 in FIGURE 1, for visually indicating the number of count of the circuit in an Arabic numeral, 0, 1, 2, 3, 4, 5, 6, 7, 8 or 9. For facilitating such a display, 7 lamps, such as neon lamps, 312, 313, 314, 315, 316, 317 and 318 are disposed in a parallelogram array, with one lamp disposed centrally thereof as shown in FIGURE 6 of the drawings. An opaque cover 319 having 7 transparent slits 320, 321, 322, 323, 324, 325 and 326 therein is provided for the lamps with one slit corresponding to and exposing a portion of each lamp and in general being diametrically superimposed over the lamps. The cover 319 is shown broken away to indicate that it may be a portion of the cabinet or housing in which the counter is mounted. Alternatively, it may be a suitable member adaptable for attachment over an opening in the housing. Selective lighting and extinction of the lamps 312 through 318 enables the display of figures having the general, readily discernible outline of Arabic numbers 1 through 9. This is more clearly apparent in FIGURE 7, showing the lamps required to be lighted for displaying the several numbers. For example, to display the number "0" for zero count, lamps 312, 314, 315, 316, 317 and 318 are lighted and lamp 313 is extinguished. To display the number "1," lamps 317 and 318 are lighted and the others are extinguished.

For a more complete understanding of the indicator shown in FIGURE 6 of the drawings, the table of FIGURE 8 may be referred to for readily determining the respective conditions of the lamps of the indicator for different counts zero through nine. The first row of the table indicates in order, from left to right, the condition of lamp 312 as to whether it is lighted or extinguished for counts 0, 1, 2, 3, 4, 5, 6, 7, 8 and 9. For simplicity, the term "on" is used to indicate that the lamp is lighted and "off" is used to indicate that it is extinguished. In entirely similar manner, the second row indicates the condition of lamp 313 for the different counts 0 through 9 and the remaining five rows indicate the conditions of lamps 314, 315, 316, 317 and 318 for each of the counts 0 through 9.

The selective lighting and extinction of lamps 312 through 318 is achieved by a half-wave rectifier circuit 319 in cooperation with display circuit 14 and other parts of the counter 10, particularly the transistor collectors from which potentials are derived and applied in certain combinations to terminals of lamps 312 through 318. By the action of these circuits, potential differences are selectively impressed across the terminals of the several lamps in accordance with the count number of the circuit.

The rectifier circuit 319 includes power transformer 320 with a primary winding 321 supplied with alternating potential from a suitable source, not shown, but which may be conventional 115 volt, 60 cycle supply, and a secondary winding 322 inductively coupled to the primary winding 321. The terminals of winding 322 are connected to ground and to a series connection of a diode 323 with its anode connected to the winding 322, a resistor 324 and the resistive element 325 of a potentiometer 326. To partially smoothen the rectified pulses produced by diode 323, a capacitor 327 is connected between the junction of resistor elements 324 and 325 and ground and for providing potential regulation, a Zener type diode element 328 is connected across capacitor 327 with its anode grounded, to limit the potential appearing across this capacitor and applied to the rectifier output resistor 325. A movable arm 329 of potentiometer 326 is connected to one first terminal of each of the lamps 312 through 318 for controlling the magnitude of a positive, pulsating potential applied to these terminals from rectifier circuit 319.

The potentials applied to the other terminals of the lamps, herein referred to as the "second" terminals, are derived from the counter circuit transistor collectors and as a means to achieve this end, seven control lines 330, 331, 332, 333, 334, 335 and 336 are connected, respectively, to the second terminals of lamps 312 through 318 through respective resistors 337, 338, 339, 340, 341, 342 and 343. Another seven control lines 344, 345, 346, 347, 348, 349 and 350 are provided and the first six of these are connected to the respective second terminals of lamps 312 through 317, through respective resistors 351, 352, 353, 354, 355 and 356. The control line 330 through 336 are connected to collector 25 of binary circuit transistor 19 through respective unidirectional diodes 357, 358, 359, 360, 361, 362 and 363 and a line 364. The cathodes of these diodes are connected through the line 364 to collector 25 to facilitate the impression of negative potentials or pulses appearing at this collector to the control lines 330 to 336 and to the lamps 312 and 318. A further effect of the diodes is to block the application of positive potentials to the control lines 330 to 336 or to block negative potentials from being applied to the collector 25 from these lines. Similarly, collector 24 of binary circuit transistor 18 is connected to each of lines 344, 345, 346, 347 and 349 through respective unidirectional diodes 365, 366, 367, 368 and 369 with the cathodes of the diodes connected to a line 370 leading to collector 24. Line 370 is connected directly to control line 348 to permit the application of negative potentials at the collector 24 to the lines and second terminals of lamps 312 through 317.

In addition to the aforedescribed connections, for applying alternate potentials from the quinary circuit to the second terminals of lamps 312 through 318, collector 67 of quinary circuit transistor 52 is connected to lines 331, 344 and 350 through a line 371 and respective resistors 372 and 373 and through a diode 374 having its anode connected to the collector 67 whereby the potential of collector 67 may be applied to lines 331 and 344 and positive potentials of collector 67 may be applied to line 350 under conditions wherein the line 350 is negative with respect to collector 67. Similarly, collector 68 of transistor 53 is connected to lines 333 and 336 through line 375 and respective resistors 376 and 377 and to line 347 through serially connected diode 378 and resistor 379. Thus, the potential of collector 68 is applied to the lines 333 and 336 in any event and to line 347 under conditions wherein the collector is more positive than line 347 since the anode of diode 378 is connected to collector 68. The potential at collector 69 of transistor 54 is applied to lines 330, 332, 334 and 349 through line 380 and respective resistors 381, 382, and 384 connected between this collector and these respective lines. Collector 70 of transistor 55 is connected to line 335 through line 385 and resistor 386 for applying this collector potential thereto and a diode 387 is connected between line 385 and line 350 with its positive terminal connected to the line 385 for applying potentials of the collector, positive with respect to the line. The line 350 is connected to each of lines 345, 346 and 347 through respective resistors 388, 389 and 390.

In the circuit 14, it is noted that one first terminal of each of the lamps 312 through 318 has impressed thereon a potential from rectifier circuit 319 which is a positive potential pulsating between minimum and maximum positive values. Also, the collector of the conducting transistor of the binary circuit is effective to apply either a minimum potential of very slight, negative value, substantially equal to zero, or a maximum potential of relatively large negative value to the line to which it is connected and to the second terminals of the respective lamps with which it has connection.

In the indicator circuit 14, the neon lamps possess well known characteristics of relative firing or lighting potential and extinction potential. That is, the firing potential herein designated $E_f$ of each lamp, is considerably in excess of its extinction potential herein designated $E_e$. It is therefore clear that subsequent to firing, any lamp is not extinguished by merely lowering the potential applied across the lamp to a value lower than the firing potential but greater than the extinction potential. Extinction results only by lowering the applied potential to the extinction potential.

In the indicator circuit 14, these characteristics of lamps 312 through 318 are correlated with the potentials derived from the collectors of the circuit transistors and the potentials derived from circuit 319 to effect firing of any lamp having a potential applied across its terminals which is substantially equal to a predetermined fraction of the algebraic difference between the maximum negative potential appearing at the collector of the conducting transistor and the maximum positive potential of rectifier circuit 319 or in other words, a predetermined fraction of the sum of the absolute values of these potentials. Thus, with these respective potentials applied to respective second and first terminals of any lamp, the lamp fires or lights. On the other hand, the extinction potentials of the lamps exceed the algebraic difference between the minimum negative collector potentials and the maximum positive potential of rectifier 319.

This may be more clearly understood by reference to the graph shown in FIGURE 10 of the drawings wherein the abscissa represents time and the ordinate represents potential values. The wave $E_{329}$ represents the pulsating direct potential applied from rectifier circuit 319 to potentiometer arm 329 and therefore, to first terminals of the neon lamps. Wave $E_c$ represents a typical potential variation at a collector of one of the circuit transistors. The instantaneous distance between waves $E_{329}$ and $E_c$ represents the algebraic difference between potentials or in other words, the instantaneous potential applied to a neon lamp. Also indicated in this figure are respective firing and extinction potentials $E_f$ and $E_e$, being fractions of the total difference between the waves.

It should be observed that at all times during which a minimum negative potential at a collector is applied to one terminal of an extinguished lamp, the lamp fails to fire irrespective of the potential applied from rectifier circuit 319 to its other terminal. This condition is represented by the potential $E_i$ which is less than $E_f$. An extinguished lamp with maximum collector potential applied to one terminal, fires when the rectifier circuit potential reaches a value such that the difference between potentials is $E_f$ and a fired lamp with a collector potential of $e_c$ at its second terminal, extinguishes at a time that the rectifier circuit potential drops to $E_e$. It should also be noted that the change of collector potential from a minimum negative value to a maximum negative value does not fire an unfired lamp unless the rectifier circuit potential is sufficiently great to produce a potential difference across the lamp of at least $E_f$. This condition is represented by the potential $E_j$ which is less than $E_f$. Also, the change in potential of a collector from maximum negative value to minimum negative value is not necessarily effective in extinguishing a fired lamp. This is represented by the potential $E_k$ which exceeds $E_e$. However, a time in the cycle of the pulsating rectifier potential does exist at which such a collector potential change would, together with a decreasing rectifier potential, decrease the potential difference across a lamp to extinguish it. However, this latter circumstance is not the usual operation of the circuit but rather the decrease in negative value of the collector potential is regarded as conditioning the circuit for extinction in response to the next decreasing potential applied by the rectifier circuit.

In accordance with the foregoing description, it is to be understood that with maximum negative transistor collector potential applied to one terminal of a neon lamp, the pulsating potential applied to the first neon lamp terminal causes the lamp to fire at a rate at which the firing and extinction potentials are cyclically applied. In the case of conventional sixty cycle per second, alternating potential, such action occurs sixty times per second. By reason of the persistance of vision of the human eye, such rapid firing and extinction of the lamp is not perceptible and the lamp appears to be lit continuously. For facilitating description and clarity in explaining my present invention, a lamp in such a condition will be herein referred to as being lit.

Accordingly, since one terminal of each of the lamps is connected to the output of rectifier circuit 319 and each of the other terminals is connected to each collector of the binary circuit transistors through respective diodes, in the absence of further influence, each of the lamps connected at their second terminal to a cut-off transistor collector would glow in the manner hereinabove described because such binary circuit transistor collector is at a maximum negative potential. Thus, for display of numbers in addition to number 8, or in other words, to extinguish one or more of the lamps, it is necessary to lessen the magnitude of the negative potential applied to the terminals of such lamp or lamps at its or their second terminals.

The potentials derived from the quinary circuit transistor collectors are therefore effective to extinguish appropriate ones of the lamps 312 through 318 to produce an Arabic numeral indicating the count number of the circuit as shown in FIGURE 6. An understanding of the manner in which circuit 14 functions to achieve such a result may best be understood by descriptions of relative potentials involved in the circuit for the display of representative numbers in response to corresponding counts, together with the wave shape of FIGURE 9 showing graphically the potentials at the control lines and at the neon lamp terminals at different counts of the circuit. In FIGURE 9, waves 391, 392, 393, 394, 395, 396 and 397, represent, respectively, the potentials appearing on control lines 330 through 336 at different counts of the counter and waves 398, 399, 400, 401, 402, 403 and 404 represent potentials appearing on control lines 344 through 350, respectively, at different counts of the counter. Waves 405, 406, 407, 408, 409, 410 and 411 represent the potentials which are a composite of waves 391 through 397 added, respectively, to waves 398 through 404. Such composite potentials appear at the second terminals of respective lamps 312 through 318.

For displaying the number 0 for zero count, it is understood that at this count, transistors 19 and 52 are cut-off with low negative potentials, herein for purposes of convenience and clarity taken to be zero potential, appearing at their collectors 25 and 67, respectively. The potentials at all other binary and quinary circuit transistor collectors are a maximum in negative value. Thus, the potentials of collectors 68, 69 and 70, which are of substantially equal minimum negative value, are applied to the control lines 330, 332, 333, 334, 335 and 336. Collector 68 is connected to lines 333 and 336 through respective resistor 376 and 377, collector 69 is connected to lines 330, 332 and 334 through respective resistors 381, 382 and 383 and collector 70 is connected to line 335 through resistor 386. Since control lines 330, 332, 333, 334, 335 and 336 are connected to second terminals of respective lamps 312, 314, 315, 316, 317 and 318 through respective resistors 337, 339, 340, 341, 342 and 343, the maximum negative potential of the conducting transistors is applied to the second terminals of these lamps to condition the same for firing. Collector 67 which is substantially at zero potential, is connected to the second terminal of lamp 313 through resistors 372 and 338 and control line 331. In addition to the aforementioned connections, collector 24 of transistor 18 is connected to the respective control lines 344, 345, 346, 347 and 349 through respective diodes 365, 366, 367, 368 and 369 and is directly connected to control line 348. Because of the maximum negative potential of collector 24 and the polarity of these diodes, the potential of this collector is applied to the second terminals of lamps 312, 314, 315, 316 and 317 through respective resistors due to neon lamp current flow therein is insignificant and considered to be zero because of the very low value of such current whereby substantially the minimum negative potential of collectors 68, 69 and 70 is applied to the second terminals of these lamps. However, since collector 67 is at substantially zero potential, a considerable electron current flows from line 370 through diode 366 and in succession through resistors 352, 338 and 372. As a consequence, considerable potential drop occurs across resistors 352 to reduce the magnitude of negative potential at the second terminal of lamp 313. By proper proportioning of resistor values in relation to potentials, such decrease in potential is controlled to condition lamp 313 for extinction if not already extinguished or for continued extinction if already extinguished, in a manner hereinabove more clearly explained with respect to FIGURE 10. Accordingly, with lamps 312 and 314 through 318 lit and lamp 313 extinguished, the number "0" is displayed by the indicator circuit as seen more clearly in FIGURE 6. It is to be observed that the substantially zero potential of collector 25 does not affect the potential of control lines 330–336 since diodes 357–363 are poled so as to present a high resistance to electron current flow to this collector therethrough.

For an understanding of the manner in which the neon lamps are selectively energized to display the number "1" for a count of one input pulse received by the circuit, it is to be understood that the state of equilibrium of the binary circuit 11 shifts from that at zero count and that the state of equilibrium of the quinary circuit remains the same as at zero count. Accordingly, the potential at collectors 24 and 67 of cut-off transistors 18 and 52 is at a minimum negative value, nearly equal to zero, as shown on waves 143 and 145 in FIGURE 2 from time $t_1$ to time $t_2$ and the collectors 25, 68, 69, 70 and 71 of respective conducting transistors 19, 53, 54, 55 and 56 are at maximum negative potentials as shown on waves 144, 146, 147, 148 and 149, respectively.

The maximum negative potential of collector 25 is applied to control lines 330, 331, 332, 333, 334, 335 and 336 through line 364 and respective diodes 357, 358, 359, 360, 361, 362 and 363. In addition, the same potential is alternately applied to control lines 330, 332, 333, 334, 335 and 336 through respective resistors 381, 382, 376, 383, 386 and 377 from respective collectors 69, 69, 68, 69, 70 and 68. Collector 67 which is at substantially zero potential is interconnected with line 331 through resistor 372. Thus, the maximum negative potential at the collectors of conductive transistors is developed at the control lines 330–336. In the case of control line 331, the potential drop across resistor 372 by reason of electron current flow from collector 25 to collector 67 produces the control line potential and in the case of the other control lines 330 and 332–336 the potential is substantially a "floating" potential since no appreciable current flows to or from these lines.

The collector 67 which is at substantially zero potential, is interconnected with control lines 344 through resistor 373 and to control lines 345, 346, and 347 through diode 374 and respective resistors 373, 388, 389 and 390. Collector 24, which also is at substantially zero potential, is directly connected to control line 348 through line 370. Accordingly, electron current flows from control lines 330, 331, 332, 333, 334 and 335 through respective resistors 337, 338, 339, 340 and 341 to the second terminals of lamps 312, 313, 314, 315 and 316 and then from these terminals through respective resistors 351, 352, 353, 354 and 355 to the control lines 344, 345, 346, 347 and 348. From these control lines the current flows to points of relatively higher potential. From control line 344, the current path is through resistor 373 to collector 67, from control lines 345, 346 and 347, the current path is through resistors 388, 389 and 390 through control line 350, diode 374 to collector 67. From control line 334, electron current flows through resistor 341 to the second terminal at lamp 316 and from this terminal through resistor 355 and through line 370 to collector 24.

The effect of the current flow as described, is to produce a potential drop across resistors 337, 338, 339 and 340 and 341 of sufficient magnitude to lower the potential at the second terminals of lamps 312, 313, 314, 315 and 316 to levels at which the maximum potential difference across these lamps at any time during the pulsating potential applied to the first terminals of these lamps is insufficient to fire the same. Thus, the lamps fail to light if extinguished or fail to re-light if already fired or lit.

On the other hand, under these conditions, the maximum negative collector potential applied to control lines 335 and 336 from collector 25 and from collectors 70 and 68, respectively, appears substantially undiminished at the second terminals of lamps 317 and 318. This is so because there are no alternate paths from these terminals to points of relatively high potential under these circumstances. As a consequence of the foregoing, lamps 317 and 318 have sufficient negative potential applied to their second terminals to effect their lighting in response to potential pulsations applied to their first terminals and the other lamps are not lit. Thus, the number "1" is displayed.

For displaying the number "2" in response to two input pulses, lamps 315 and 318 are extinguished and the remaining lamps 312, 313, 314, 316 and 317 are lit. Without a detailed explanation, it may be understood that in a manner similar to that described hereinabove with respect to the display of numbers "0" and "1," control lines 344, 345, 346, 347, 348 and 349 have maximum negative collector potential applied thereto from collector 24. This potential appears at the second terminals of lamps 312, 313, 314, 316 and 317 to effect lighting of these lamps but the substantially zero potential of collector 68 provides an electron current path from control line 347 whereby a potential drop across resistor 354 due to current flow, lowers the potential at the second terminal of lamp 315 to condition it for extinction. The substantially zero potential of collector 68 is also applied to control line 336 through resistor 377 and thus, to the second terminal of lamp 318. No connection exists to this control line or to lamp 318 from a point of low potential under these circumstances and thus, lamp 318 is also conditioned for extinction. As a consequence lamps 312, 313, 314, 316 and 317 are lit and lamps 315 and 318 are extinguished and the number "2" is displayed.

In a manner similar to that described with respect to the display of the number "0," "1" and "2" the combination of binary and quinary circuit collector potentials are utilized in the indicator circuit to selectively light certain lamps and maintain others extinguished to display other numbers corresponding to the number of pulses received by the counter.

In accordance with this feature of my present invention, for combining binary and quinary circuit potentials to produce numerical count display, it should be observed that no additional transistors are needed and only a relatively few and inexpensive passive components are required.

The versatility of my present invention facilitates the interchange of visual count indicators and according to another feature of my invention, a display circuit as shown at 413 in FIGURE 11 of the drawings may be substituted for display circuit 14 in FIGURE 1. The display circuit 413 incorporates a commercially available neon gas filled, transparent envelope discharge tube 414 having a plate 415 and ten electrodes 416, 417, 418, 419, 420, 421, 422, 423, 424 and 425 spaced from the plate 415. The plate 415 has a positive potential, +E, applied thereto through a resistor 426 from a source, represented by a battery. The electrodes 416 through 425, although for simplicity and convenience, are shown as being planar, in reality are shaped as Arabic numerals 0 through 9, respectively, and circuit 413 is effective in appropriately combining the potentials of binary and quinary circuits of counter 10 to apply potentials to these electrodes to selectively establish a greater potential difference between plate 415 and that electrode shaped as a number corresponding to the count of the circuit. Under these conditions, that electrode has a potential applied thereto with respect to plate 415 to cause a gaseous ionization in the region of the electrode to produce a characteristic glow in this region. Thus, the electrode "lights" and since the potential applied to the other electrodes is insufficient to cause such a glow in the regions thereof, the glowing electrode is readily and easily discernible among the others which are not glowing, to indicate a circuit count number.

For properly combining binary and quinary circuit potentials, circuit 413 includes ten transistors 426, 427, 428, 429, 430, 431, 432, 433, 434 and 435 of the N-P-N type with respective collectors 436, 437, 438, 439, 440, 441, 442, 443, 444 and 445 connected to respective electrodes 416 through 425. These collectors are also connected through respective load resistors 446, 447, 448, 449, 450, 451, 452, 453, 454, and 455 to a lead 456 having a positive potential $+E_2$ applied thereto. The respective emitters 457, 458, 459, 460, 461, 462, 463, 464, 465 and 466 are connected directly to a lead 467 having a positive biasing potential $E_3$ applied thereto.

The potentials of the counter circuit transistor collectors are properly combined and applied to the bases 468, 469, 470, 471, 472, 473, 474, 475, 476 and 477 of respective transistors 426, 427, 428, 429, 430, 431, 432, 433, 434 and 435 of circuit 413. Specifically, pairs of bases 468 and 469, 470 and 471, 472 and 473, 474 and 475, 476 and 477 are connected to respective lines 371, 375, 380, 385 and 817 through respective diodes of the pairs 478 and 479, 480 and 481, 482 and 483, 484 and 485, 486 and 487 with the anodes of each diode connected to the corresponding transistor base. Thus, negative potentials appearing at the quinary circuit transistor collectors are applied to the bases of transistors of circuit 413.

The potentials of collectors 24 and 25 are applied to lines 370 and 364, respectively. Line 370 is connected to bases 469, 471, 473, 475 and 477 through respective resistors and parallel connected diode combinations 488– 488A, 489–489A, 490–490A, 491–491A and 492–492A and line 364 is connected to bases 468, 470, 472, 474 and 476 through respective pairs of parallel connected resistor-diode combinations 493 and 494, 495 and 496, 497 and 498, 499 and 500, and 502 and 504 with the positive terminal of each of these diodes connected to the line 364.

It is to be observed in FIGURE 11 that the potential of each binary circuit transistor collector is combined with each potential at the different quinary circuit transistor collectors and is applied to the base of a different transistor of the circuit 413. For each count of the circuit 10, a single binary circuit transistor collector and a single quinary circuit transistor collector are at substantially zero potential. Thus, for each count, combined potential from different binary and quinary circuit collectors is substantially zero at one end of the bases of the circuit 413. For zero count, collectors 25 of transistor 19, and 67 of transistor 52 are at zero potential, and the potential at base 468 of transistor 426 is near zero since these potentials are combined at this base. At this count, all other transistor collectors are at maximum negative values and these potentials are applied to the other bases of the circuit 413. For a count of one, the potential of collector 24 of transistor 18 becomes zero and thus, the potential at base 469 where this potential is combined with that of collector 67 of transistor 52, is near zero. In response to successive pulses producing counts two, three, four, etc., the respective bases 470, 471, 472, etc., are uniquely near zero potential.

The transistors 426 through 435 are responsive to potentials applied to their bases to control the flow of current to the transistor collectors and being of the N-P-N type, increased negative potentials applied to the bases with respect to the emitters, reduces the electron current flow to the transistor collectors and lesser negative potentials applied to the bases, increase the electron flow to the collectors.

Accordingly, the transistor of circuit 413 which has the zero potential applied to its base, has a heavier current conduction than the other transistors of this circuit and consequently, the load resistor of such a transistor has a great potential difference thereacross than other load resistors of this circuit. The direction of current flow through the transistors is such as to produce a potential that is negative at the transistor collectors with respect to the other end of the transistor load resistors. Since these potentials are applied to the electrodes 416 through 425, the transistor having the unique zero potential applied to its base, produces a uniquely large negative potential at its collector and at the corresponding one of electrodes 416 through 425. Such an increased potential is effective to cause ionization of the gas within the tube and particularly within the region of this electrode. As is commonly termed, "firing" occurs to produce a characteristic glow along the outline of this electrode. Thus, since the electrode has the shape of a numeral corresponding to the number of count of the circuit, the count of the circuit is visually displayed.

The action of the circuit may be more fully explained and understood by reference to FIGURE 12 illustrating potentials at the bases and collectors of the transistors 426 through 435 of circuit 413. From time $t_0$ to time $t_1$, or in other words at zero count, wave 503 indicates the potential at base 468 of transistor 426 near zero potential. At all other times, the potential at this base is indicated as being a large negative value. Similarly, the waves 504, 505, 506, 507, 508, 509, 510, 511 and 512 indicate respective base potentials at maximum negative values except for potentials near zero for times $t_1$ to $t_2$, $t_2$ to $t_3$, etc., at bases 469, 470, etc. Corresponding to such potentials the potentials at the collectors 436 through 445 have the shape shown at 513, 514, 515, 516, 517, 518, 519, 520, 521 and 522. At zero count and from time $t_0$ to time $t_1$, wave 513 indicates a large negative potential at collector 436 and therefore at electrode 416 and a considerably lesser potential at all other times. Similarly, wave 514 indicates a uniquely large negative potential at collector 437 for count one or in other words, from time $t_1$ to time $t_2$ and each of the other waves indicates a uniquely large negative potential for a specific count of the circuit at a particular corresponding time interval.

With respect to the indicator of circuit 413, it is observed that more clearly readable numerals may be had in the form of electrodes than in circuit 14 but that the circuit 413 requires ten active circuit elements in the form of transistors in addition to a number of resistors and diodes with consequent greater expense. Thus, the circuit of FIGURE 11 is interchangeable with the indicator circuit 14 of FIGURE 1 and either of these circuits may be utilized according to an operator's desire.

In accordance with another feature of my present invention, as shown in FIGURE 13 of the drawings, the circuit 413 may be somewhat simplified and produce entirely satisfactory results by the elimination of the diodes 494, 496, 498, 500 and 502. Under these conditions, the shape of potentials applied to bases 468 through 477 are as shown at 523, 524, 525, 526, 527, 528, 529, 530, 531 and 532 in FIGURE 14 of the drawings.

In this circumstance, the collector wave shapes corresponds to the wave shapes shown in FIGURE 3, but the biasing potential applied to the transistor emitters is more critical and difficult of accurate adjustment. In circuits wherein such simplification may be effected, advantages of economy will result.

Another simplification of the circuit 413 as shown in FIGURE 15 may be achieved according to another feature of my invention, by the elimination of diodes 494, 496, 498, 500 and 502 and the substitution of appropriate resistors 478A, 479A, 480A, 481A, 482A, 483A, 484A, 485A, 486A and 487A for diodes 478 through 487. In this circumstance the wave shapes of potentials at the transistor bases are as shown at 533, 534, 535, 536, 537, 538, 539, 540, 541, and 542 in FIGURE 16 and the collector wave shapes are again as shown in FIGURE 3 of the drawings. The emitter biasing potential in this embodiment of my invention, is even more critical than with the previously mentioned simplifications. This simplification may also produce certain advantages in economy.

The counter hereinabove described, together with either of the display circuits is effectively operable with provision for external reset, that is, with terminals 204 and 205 not interconnected and reset potentials applied to terminal 204 at counting rates in excess of 500,000 input pulses per second with entirely satisfactory performance. With terminals 204 and 205 interconnected for internal reset and switch 180 positioned for division by a number less than ten, the frequency response is somewhat decreased. However, at frequencies considerably in excess of this rate, as for example, of the order of one million input pulses per second, certain adverse effects may occur in the circuit resulting in erratic and inaccurate counting. As an example, at such higher rates, the output transistor 19, of the binary circuit 11 becomes excessively loaded by the quinary input circuit and in addition, increased bias of quinary circuit transistor bases is required for stability.

In accordance with still another feature of my present invention as shown in FIGURE 17 of the drawings, these adverse effects are overcome by a modification of the counter circuit of FIGURE 1. In this circuit, an isolation stage 544 is interposed in the line 42 which connects arm 41 and the capacitors 103, 111, 116, 121 and 126 leading to the quinary circuit bases through additional elements. The isolation stage includes a transistor 545 of the P–N–P type, having a base 546 connected to potentiometer arm 41, a collector 547 connected to a source of negative biasing potential represented by the battery shown having potential E, and an emitter 548 connected to ground through a resistor 549. The transistor 545 produces an output pulse of the same magnitude, wave shape and polarity as the pulse received from arm 41 but the impedance presented to load resistor 37 of binary transistor 19 by the connection to base 546, is much higher than that presented by the capacitors 103, 113, 116, 121 and 126 to the circuit of emitter 548. Thus, the load resistor 37 is not so heavily loaded as it would be in the absence of the isolation stage. This isolation facilitates power amplification and higher counting rates by the circuit.

At higher counting rates it is also noted that greater bias and potentials applied to diodes 104, 112, 117, 122 and 127 from resistive element 107 and arm 108 improves accuracy of count. To facilitate automatic bias control at such higher counting rates an automatic biasing stage, 551 is coupled to arm 108 in the circuit of FIGURE 1. Stage 551 includes a transistor 552 of the N–P–N type having an emitter 553 connected through a resistor 550 to the line leading from the contact 31 for applying a suitable negative biasing potential thereto, a base 554 connected to the emitter 548 of the transistor 545 through serially connected diode 555 and adjustable capacitors 556 and 557 for receiving pulses from this emitter. A collector 558 of transistor 552 is connected directly to arm 108 for applying the bias developed by this stage to the arm 108. For passing positive pulses to base 554, the cathode of diode 555 is connected to the base 554 and an inductor 560 is connected between ground and the junction between capacitors 556 and 557 to provide an effective high pass filter type of circuit for pulses received from the binary circuit through stage 544. A steady negative potential bias is applied to base 554 from contact 31 through a resistor 561 connected between the junction of base 554 and the cathode of diode 555 and contact 31. Resistor 562 is connected between the anode of diode 555 and contact 31. Thus, it is noted that the pulsed potential of emitter 548 applied to base 554 through capacitors 556 and 557 is rectified by diode 555 and that the magnitude of such potential increases with the counting rate by reason of the fact that increased impedance is presented to such potentials by inductor 560 at higher counting rates. That is, the shunt path to ground through the inductor is increased in impedance at higher counting rates whereby the pulses are applied to diode 555 with greater intensity resulting in the application of greater rectified, direct potential applied to base 554. The output potential of collector 558 varies with the bias applied to base 554 and consequently, at increased counting rates, this stage is effective to automatically increase the bias applied to the diodes 104, 112, 117, 122 and 127. The adjustability of resistor 107 facilitates refinements in determining such potential bias for precision and accuracy.

An even further improvement in the circuit of FIGURE 17 for improving the counting rate response and stability of the circuit is the cross coupling of quinary circuit collectors with base circuits of "next adjacent" transistors in the counting loop. Thus, collectors 67, 68, 69, 70 and 71 are connected, respectively, to the negative terminals of diodes 112, 117, 122, 127 and 104 through respective resistors 563, 564, 565, 566 and 567.

While the many components of my invention hereinabove described may be of different parameters determinable by one skilled in the art, the following table sets forth typical circuit parameters according to an embodiment of my invention operated with admirable results.

Resistors:

| | |
|---|---|
| 26 and 28 | 8,200 ohms. |
| 46A and 49A | 470 ohms. |
| 72 | 500 ohms. |
| 72' | 2,700 ohms. |
| 78, 79, 80, 81, 83, 84, 85, 86, 88, 89, 90, 91, 93, 94, 95, 96, 98, 99, 100, 101 | 18,000 ohms. |

| | |
|---|---|
| 446, 447, 448, 449, 450, 451, 452, 453, 454, 455, 488, 489, 490, 491, 492, 493, 495, 497, 499, 501, 563, 564, 565, 566 and 567 | 22,000 ohms. |
| 35 | 150 ohms. |
| 36 | 2,700 ohms. |
| 39, 40, 137, 138, 139, 140 and 141 | 68,000 ohms. |
| 32 and 33 | 33,000 ohms. |
| 74, 75, 76, 77, 196, 202 and 216 | 3,300 ohms. |
| 110, 115, 120, 125, 130, 379, 561 and 562 | 10,000 ohms. |
| 132, 133, 134, 135, 136, 170, 171, 172, 173, 174, 175, 176, 177, 178, 179, 197, 203, 388, 389, 390 | 47,000 ohms. |
| 211, 372, 373, 376, 377, 382, 383, 384, 386 | 27,000 ohms. |
| 212 | 1,500 ohms. |
| 337, 338, 339, 340, 341, 342, 343, 351, 352, 353, 354, 355 and 356 | 100,000 ohms. |
| 550 | 2,700 ohms. |
| 559 | 680 ohms. |
| Adjustable resistors 37 | 2,700 ohms. |
| Adjustable resistors 107 | 20,000 ohms. |
| Adjustable resistors: | |
| 218 | 25,000 ohms set on 12,000 ohms. |
| 219 | 25,000 ohms set on 18,000 ohms. |
| 220 | 50,000 ohms set on 27,000 ohms. |
| 221 | 100,000 ohms set on 56,000 ohms. |
| 222 | 250,000 ohms set on 150,000 ohms. |
| Capacitors: | |
| 27 and 29 | 270 micromicrofarad. |
| 34 and 215 | .01 microfarad. |
| 39 and 40 | 100 micromicrofarad. |
| 46B and 49B | 68 micromicrofarad. |
| 82, 87, 92, 97, 102, 103, 111, 116, 121, 126 | 330 micromicrofarad. |
| 105, 113, 118, 123, 128 | .001 microfarad. |
| 192, 198 | .0047 microfarad. |
| 215 | .01. |
| 327 | 1.0 microfarad. |
| 556 and 557— | |
| 556 | 20–500 mmf. set on 470 mmf. |
| 557 | 10–100 mmf. set on 47 mmf. |
| Inductor 560 | 1 millihenry. |
| Diodes 104, 106, 112, 114, 117, 119, 122, 124, 127, 129, 150, 151, 152, 153, 154, 155, 156, 157, 158, 159, 160, 161, 162, 163, 164, 165, 166, 167, 168, 169, 193, 199, 357, 358, 359, 360, 361, 362, 363, 365, 366, 367, 368, 369, 374, 378, 387, 478, 479, 480, 481, 482, 483, 484, 485, 486, 487, 555, 488A, 489A, 490A, 491A, and 492A | 1N191. |
| Transistors: | |
| 18, 19, 43, 44, 52, 53, 54, 55, 56, 206 and 552 | CBS Hytron 2N440. |
| 426, 427, 428, 429, 430, 431, 432, 433, 434, 435, 545 | GT 1200 2N450. |
| Neon display tube 414 | Burroughs 6844–A. |
| Battery E (FIGURE 1) | Approximately 30 volts. |
| Neon lamps 312, 313, 314, 315, 316, 317 and 318 | General Electric NE76. |

I claim:

1. An apparatus comprising a pair of multistable circuits each having respective first and second pluralities of states of stable equilibrium and respective first and second pluralities of output connections, a different output connection of each plurality having a unique direct potential for each state of equilibrium, means connecting a pair of serially connected diodes between each output connection of the first plurality of output connections and a different output connection of the second plurality, the junction between said diodes being to like diode terminals, and means selectively connectable with the junction of any pair of said diodes.

2. An apparatus comprising a binary circuit having a pair of states of stable equilibrium and being responsive to input pulses for alternating between said states of equilibrium, said binary circuit including a pair of output connections, each output connection having one direct potential in one condition of equilibrium of said binary circuit and another potential in another condition of equilibrium thereof, a quinary circuit having five states of stable equilibrium and being responsive at an input connection thereof to five successive input pulses for changing said circuit to said five different states of equilibrium in a predetermined order, means coupling one of the output connections of said binary circuit to the input connection of said quinary circuit, said quinary circuit having five output connections, a different one of said output connections of said quinary circuit uniquely having said one direct potential and the other connections having said other direct potential in any one condition of equilibrium of said quinary circuit, a count indicator circuit including a plurality of pairs of diodes, the diodes of each pair having like elements connected together to form an output terminal, half of said plurality of pairs of diodes each having one diode thereof connected to one output connection of said binary circuit and the other diode thereof connected to a different one of said quinary output connections, the other half of said plurality of pairs of diodes each having one diode thereof connected to the other output connection of said binary circuit and the other diode thereof connected to a different one of said quinary output connections.

3. An apparatus comprising a pair of circuits each including a plurality of transistors with base and collector electrodes intercoupled to form multistable circuits each having a plurality of states of stable equilibrium in each of which a different transistor is in a unique condition of conduction, each transistor being responsive to a pulse of a predetermined polarity applied to its base for altering the condition of conduction thereof from said unique condition, the collector of each transistor having one potential in a unique condition of conduction and another potential in another condition of conduction, the change in condition of any transistor to said unique condition being effective to produce a pulse of polarity opposite to said predetermined polarity, a different pair of unidirectional devices serially connected between each collector of one of said circuits and a collector electrode of the other of said circuits, each pair of devices connected to form a junction between said pair of devices and being poled to pass pulses of said predetermined polarity from collectors to the junctions between said devices, means for selectively interconnecting the junction between any specific pair of devices and a selected base of each of said circuits whereby said circuits are resettable to any combination of states of equilibrium in response to the coincidence of pulses of polarity opposite to said predetermined polarity produced at collectors connected to said specific pair of unidirectional devices.

4. An apparatus comprising a plurality of pairs of serially connected unidirectional devices each device having an anode electrode and a cathode electrode, each pair having a first and a second terminal and like electrodes of devices of each pair being joined to form a junction, means alternately applying first and second potentials to first terminals of selected ones of said pairs and simultaneously alternately applying second and first potentials to first terminals of others of said pairs and means sequentially applying a first potential to a second terminal of said pairs and a second potential to the other second terminals of said pairs whereby the junctions of said pairs sequentially assume said one potential in response to the coincident application thereof to each terminal of the pair.

5. An apparatus comprising a pair of multistable circuits each including a plurality of active circuit elements each having an input and an output electrode, the input and output electrodes of each circuit being cross-coupled, each circuit having a plurality of states of stable equilibrium in each of which one of the elements of the circuit is in a unique condition of conduction with respect to the other elements of the same circuit, the output electrode of an element in a unique condition of conduction having a unique potential with respect to other output electrodes of the same circuit having substantially the same potential, each of said elements being responsive to a potential pulse of a predetermined polarity applied to its input electrode to produce said unique condition of conduction therein, means combining the potential at each output electrode of the elements of one of said circuits with the potential of each output electrode of the elements of the other of said circuits, means for selecting the combined potential of any pair of said output electrodes and means applying said combined potentials to the input electrode of an active circuit element in one of said multistable circuits and to the input electrode of an active circuit element in the other of said multistable circuits whereby in response to a coincident application of potentials of said predetermined polarity said pair of circuits is reset to a predetermined condition of equilibrium.

6. An apparatus comprising a first and a second plurality of active circuit elements each having an input electrode and an output electrode, the input and output electrodes of each plurality being intercoupled to form respective circuits having plural states of stable equilibrium in each of which one of the elements of each plurality is in a unique condition of conduction with respect to other elements of the same plurality, the output electrode of each element in a state of unique conduction having a unique potential, means interconnecting a different pair of diodes between the output electrode of each element of one circuit and the output electrode of each element of the other circuit, each diode having an anode electrode and a cathode electrode, said diodes having like electrodes joined to form a junction between each pair of diodes, a further pair of diodes, means selectively coupling the junction between any of said pairs of diodes and any one of the input electrodes of both of said circuits respectively through said further pair of diodes and means for applying a potential bias to each of said further pair of diodes for passing pulses of a predetermined polarity and blocking pulses of an opposite polarity from application to said input electrodes from said junctions.

7. A circuit comprising a first pair of active circuit elements each having an input electrode and an output electrode, said input and output electrodes being intercoupled to form a multistable circuit having a plurality of states of stable equilibrium in each of which one of said elements is in a unique condition of conduction, a further pair of active circuit elements each having an input electrode, an output electrode and a third electrode, the input electrode and output electrode of each of said pair of further elements being jointly coupled to a different one of said input electrodes of said first pair of elements and the third electrodes of said further pair of elements being coupled to a different one of said input electrodes of said first pair of said elements, the third electrode of each further element being coupled to a different input electrode of said first pair of elements from that coupled to the input and output electrodes of said further element.

8. An apparatus comprising first and second pluralities of transistors, each having a base and a collector, the bases and collectors of each transistor being intercoupled with other bases and collectors of transistors of the same plurality to form a pair of multistable circuits each having a plurality of states of stable equilibrium in each of which one of the transistors of each plurality is in a unique condition of conduction, a collector of one of the transistors of said first plurality being coupled to the bases of the transistors of said second plurality, the change in each transistor from a non-unique condition of conduction to a unique condition of conduction being effective to produce a pulse of predetermined polarity at the collector of the transistor, a diode connected to the base of each of the transistors of said second plurality and being poled to pass pulses of said predetermined polarity from the collector of said one of the transistors of said first plurality, means including a further transistor for applying a potential bias to each of said diodes and having a base and a collector, means responsive to pulses at the collector of said one of the transistors of said first plurality of transistors for applying a pulse to the base of said further transistor, an inductor connected to the base of said further transistor to provide an increased potential at the base of said further transistor as the rate at which pulses are applied thereto increases.

9. In a bistable binary circuit having first and second active circuit elements each having a control electrode and an output electrode, the control electrode of each active circuit element being coupled to the output electrode of the other of the active circuit elements, the improvement comprising: first and second transistors each having a base, an emitter, and a collector; means connecting the control electrode of said first active circuit element to the emitter of said first transistor and to the collector and base of said second transistor; means connecting the control electrode of said second active circuit element to the emitter of said second transistor and to the collector and base of said first transistor.

10. In a bistable binary circuit having first and second transistors each having a base and a collector, the base of each transistor being coupled to the collector of the other of the transistors, the improvement comprising: third and fourth transistors each having a base, an emitter, and a collector; means connecting the base of said first transistor to the emitter of said third transistor and to the collector and base of said fourth transistor; means connecting the base of said second transistor to the emitter of said fourth transistor and to the collector and base of said third transistor.

11. An apparatus comprising a plurality of active circuit elements each having an input and an output electrode, said electrodes being coupled to form a multistable circuit having a plurality of states of stable equilibrium in each of which one of the elements is in one condition of conduction and each of the other elements is in another condition of conduction, a first plurality of diodes each having first and second electrodes, each of said diodes having said first electrodes connected to a different one of said input electrodes, means for applying a succession of pulses of predetermined polarity to the second electrode of each of said diodes, means for applying a potential bias of predetermined polarity to the first electrode of each of said diodes, said potential bias bearing in accordance with the rapidity of said succession of pulses, said means for applying a potential bias including a transistor having a collector electrode connected to the first electrode of each of said diodes and having a base electrode connected to receive input pulses to said apparatus, an inductor connected in parallel with the collector-base circuit of said transistor, means for applying a potential proportional to that across said inductor to said second electrode of the diode connected to the input electrode of the element in said unique condition of conduction.

12. An apparatus comprising a plurality of active circuit elements each having an input and an output electrode, said electrodes being coupled to form a multistable circuit having a plurality of states of stable equilibrium in each of which one of the elements is in one condition of conduction and each of the other elements is in another condition of conduction, a first plurality of diodes each having first and second electrodes, each of said diodes having said first electrodes connected to a different one of said input electrodes, means for applying a succession of pulses of predetermined polarity to the second electrode of each of said diodes, means for applying a potential bias of predetermined polarity to the first electrode of each of said diodes, said potential bias bearing in accordance with the rapidity of said succession of pulses, said means for applying a potential bias including a transistor having a collector electrode connected to the first electrode of each of said diodes and having a base electrode connected to receive input pulses to said apparatus, an inductor connected in parallel with the collector-base circuit of said transistor, a second plurality of diodes each connected between the output electrode of a different one of said elements and the second electrode of the diode of said first plurality of diodes connected to the input electrode of said different one of said elements and being poled to pass potentials of said predetermined polarity from said output electrodes to said input electrodes.

References Cited by the Examiner
UNITED STATES PATENTS

| | | | |
|---|---|---|---|
| 2,521,788 | 9/1950 | Grosdoff | 235—92 |
| 2,540,442 | 2/1951 | Grosdoff | 235—92 |
| 2,644,893 | 7/1953 | Gehman | 307—88.5 |
| 2,644,896 | 7/1953 | Lo | 307—88.5 |
| 2,745,093 | 5/1956 | Holman et al. | 340—332 |
| 2,783,408 | 2/1957 | Williams et al. | 313—109.5 |
| 2,843,320 | 7/1958 | Chisholm | 235—92 |
| 2,848,628 | 8/1958 | Altschul | 307—88.5 |
| 2,851,220 | 9/1958 | Kimes | 235—92 |
| 2,970,226 | 1/1961 | Skelton et al. | 307—88.5 |
| 2,975,410 | 3/1961 | Groce et al. | 340—347 |

ARTHUR GAUSS, *Primary Examiner.*

ABRAHAM BERLIN, WALTER W. BURNS, Jr.
*Examiners.*

J. F. MILLER, S. D. MILLER, *Assistant Examiners.*